(12) United States Patent
Song et al.

(10) Patent No.: US 9,610,686 B2
(45) Date of Patent: Apr. 4, 2017

(54) TORQUE-FREE ROBOT ARM

(75) Inventors: Jae-Bok Song, Seoul (KR); Hwi-Su Kim, Seoul (KR)

(73) Assignee: KOREA UNIVERSAL RESEARCH AND BUSINESS FOUNDATION, Seoul (KR)

(*) Notice: Subject to any disclaimer, the term of this patent is extended or adjusted under 35 U.S.C. 154(b) by 32 days.

(21) Appl. No.: 14/343,858

(22) PCT Filed: Sep. 6, 2012

(86) PCT No.: PCT/KR2012/007198
§ 371 (c)(1),
(2), (4) Date: Mar. 9, 2014

(87) PCT Pub. No.: WO2013/036054
PCT Pub. Date: Mar. 14, 2013

(65) Prior Publication Data
US 2014/0202276 A1    Jul. 24, 2014

(30) Foreign Application Priority Data
Sep. 9, 2011  (KR) .................. 10-2011-0092171

(51) Int. Cl.
*B25J 18/04* (2006.01)
*B25J 9/06* (2006.01)
(Continued)

(52) U.S. Cl.
CPC ................. *B25J 9/06* (2013.01); *B25J 9/046* (2013.01); *B25J 9/08* (2013.01); *B25J 17/00* (2013.01);
(Continued)

(58) Field of Classification Search
CPC ............. F16H 57/0412; F16H 57/0471; F16H 57/0497; F16C 37/007; B23Q 11/126;
(Continued)

(56) References Cited

U.S. PATENT DOCUMENTS 4,756,204 A * 7/1988 Wittwer ............... B25J 19/0016
16/401
5,046,375 A * 9/1991 Salisbury, Jr. ........... B25J 9/046
414/7
(Continued)

FOREIGN PATENT DOCUMENTS

JP     2003-181789 A    7/2003
KR    10-0788787 B1   12/2007
(Continued)

OTHER PUBLICATIONS

Changhyun Cho et al., "Design of a 2-dofs Manipulator with gravity compensators", Fall Conference and Journal of The Korean Society of Mechanical Engineers, pp. 1409-1413, Nov. 3, 2010.
(Continued)

*Primary Examiner* — William C Joyce
*Assistant Examiner* — Randell J Krug
(74) *Attorney, Agent, or Firm* — Rabin & Berdo, P.C.

(57) ABSTRACT

The present invention provides a torque-free robot arm, comprising: a base unit; and a first link in which one end is rotatably connected to the base unit to form a first joint as a rotary shaft horizontal to the ground and the center of gravity is separated from the first joint, wherein the first link includes one end arranged at the first joint, the other end arranged along the longitudinal direction of the first link, and a first counter balancer for compensating the gravity of the first link when the first link is rotated around the first joint.

12 Claims, 18 Drawing Sheets

(51) Int. Cl.
*B25J 9/08* (2006.01)
*B25J 18/00* (2006.01)
*B25J 19/00* (2006.01)
*B25J 9/04* (2006.01)
*B25J 17/00* (2006.01)
*B25J 15/02* (2006.01)

(52) U.S. Cl.
CPC ........... *B25J 18/002* (2013.01); *B25J 19/002* (2013.01); *B25J 19/0016* (2013.01); *B25J 15/0233* (2013.01); *Y10T 74/20329* (2015.01)

(58) Field of Classification Search
CPC . B25J 18/002; B25J 9/06; B25J 19/002; B25J 15/0233; B25J 9/08; B25J 19/0016
USPC .............................. 901/48; 74/490.05, 490.01
See application file for complete search history.

(56) References Cited

U.S. PATENT DOCUMENTS

| | | | | |
|---|---|---|---|---|
| 6,253,458 B1 * | 7/2001 | Raab | .................... | G01B 5/0016 33/1 N |
| 6,298,569 B1 | 10/2001 | Raab et al. | | |
| 8,006,850 B2 * | 8/2011 | Rotheisler | ............... | B66C 23/14 212/196 |
| 2002/0162414 A1 | 11/2002 | Lundstrom et al. | | |
| 2012/0095596 A1 * | 4/2012 | Cole | ......................... | B25J 9/06 700/253 |

FOREIGN PATENT DOCUMENTS

| | | |
|---|---|---|
| KR | 10-0909041 B1 | 7/2009 |
| KR | 10-2010-0064654 A | 6/2010 |
| KR | 10-2011-0024834 A | 3/2011 |
| KR | 10-2011-0035917 A | 4/2011 |

OTHER PUBLICATIONS

Changhyun Cho et al., "Static Balancing of a 2-dofs manipulator", The 4th International Conference on the Advanced Mechatronics (ICAM2010), pp. 433-438, Jul. 6-9, 2010.
Wei Wang et al., "Contact Detection and Reaction of a Wheelchair Mounted Robotic Arm Equiped with Mechanical Gravity Canceller", The 2010 IEEE/RSJ International Conference on Intelligent Robots and Systems (IROS 2010), Oct. 18-22, 2010, pp. 4378-4383.

* cited by examiner

TORQUE-FREE ROBOT ARM

TECHNICAL FIELD

The present invention relates to a torque-free robot arm, and more particularly, to a robot arm which is equipped with a gravity compensation mechanism or a counterbalance (counter-balance; counter balance) mechanism capable of compensating for or counterbalancing gravitational torques generated by the robot mass when the robot arm is moved and is held in posture, and allows the gravity compensation mechanism to be extended to a multi-degree-of-freedom (DOF) mechanism, so that when the robot arm is driven, required torques generated by the robot mass over the entire robot arm are zero.

BACKGROUND ART

A wide range of service robots have been developed so far along with an increase in interest in and demand for service robots, but are not activated as compared to existing industrial robots. It is widely believed that the main cause of such phenomenon is that the price of the existing service robots developed is significantly high as compared to the performance thereof. In particular, because the price of a robot arm capable of performing a work such as gripping and moving an object is greatly high, the current service robot market is limited to just cleaning robots. Thus, the optimization of the price of the robot arms through the development of low-cost robot arms is essential to activate the service robot industry.

A variety of mechanical and electronic components are used in the actual design and production of the robot arms. The cost spent on purchasing a speed reducer and a motor constituting a joint of a robot, and a motor controller reaches up to 90% of the production costs. Recently, most robot arms employ low-cost but high-performance motors and speed reducers in order to ensure work performance (payload, driving speed, work space, etc.). This contributes to an increase in the entire cost of the robot arms, which makes it difficult to form a robot arm market.

A gravity compensation mechanism as a representative method developed for the optimization of the price of the robot arms refers to a mechanism that counterbalances gravitational torques generated by the robot mass at robot joints to minimize torques which are necessary to perform the work.

Korean Patent Laid-Open Publication No. 10-1994-0006726 discloses a gravity compensation mechanism for a robot. However, such a gravity compensation mechanism entails a problem in that since it should be mounted at a shoulder part, a considerable mounting space is needed, or smooth compensation of high resolution is not easy due to a considerable range of a compensation force for a rotation angle of a link center. Since the gravity compensation mechanisms that have been developed so far are designed so as to be mainly applied to industrial robots, their size and counterbalancing method are difficult to apply to the service robot arms. In addition, the existing developed gravity compensation mechanism for a service robot arm is not easy difficult to apply to a multi-degree-of-freedom (DOF) mechanism and as well as is difficult to apply to an actual robot arm due to complexity of the mechanism. Therefore, there is a need for the development of a multi-degree-of-freedom (DOF) counterbalance mechanism which can be applied to an actual robot arm in order to develop a low-cost robot arm.

DISCLOSURE OF INVENTION

Technical Problem

Accordingly, the present invention has been made to solve the above-mentioned problems occurring in the prior art, and it is an object of the present invention to provide an torque-free robot arm, which is equipped with a multi-degree-of-freedom (DOF) counterbalance mechanism developed to able be to compensate for gravitational torques generated by the robot mass at all the points according to its posture when the robot arm is driven, using pure mechanism elements such as springs and the like.

That is, the torque-free robot arm proposed by the present invention can effectively compensate for the required torques varying depending on the position of the robot arm through a counterbalance mechanism mounted thereon. In addition, the counterbalance mechanism is expanded to several axes so that the gravitational torques of lower (i.e., elbow and wrist) joints varying depending on the rotation of an upper (i.e., shoulder) joint can also be compensated.

Furthermore, the proposed torque-free robot arm adopts a counterbalance mechanism, and a torque due to the robot mass is set to zero which is necessary at each joint when the robot arm is moved and held in posture through a proper joint arrangement. By virtue of this, the development of the low-cost robot arm can be realized by minimizing the requirements of motors and speed reducers used at joints of the robot and reducing the cost of the robot.

Technical Solution

To achieve the above object, in one aspect, the present invention provides a torque-free robot arm including: a base unit; and a first link rotatably connected at one end thereof to the base unit to form a first joint as a rotary axis horizontal to the ground surface, the center of gravity being separated from the first joint, wherein the first link includes a first counter balancer that is disposed at one end thereof at the first joint and is disposed at the other end thereof in a longitudinal direction of the first link so that the first counter balancer compensates for the gravity of the first link when the first link is rotated about the first joint.

In the torque-free robot arm, the first counter balancer may include: a first spring block disposed spaced apart from a first pressing flange disposed at the base unit to transfer a rotational force applied thereto to the first link so that the first spring block can be moved along a longitudinal direction of the first link; a first counter balance wire connected at one end thereof to an outer peripheral portion of the first pressing flange, which is deviated from the center of rotation of the first pressing flange relative to the first joint, and fixedly mounted at the other end thereof to the first spring block so that when the first link is rotated about the first joint, the first spring block is moved along the longitudinal direction of the first link; and a first compression spring disposed between the first spring block and the first pressing flange.

In the torque-free robot arm, the first link may include: a pair of first link plates disposed opposed to each other such that the first spring block and the first compression spring are interposed therebetween, and including a first link plate A part disposed between the first pressing flange and the first compression spring and a first link plate B part disposed such that the first spring block is positioned between the first compression spring and the first link plate B part; and a first link shaft disposed between the first link plates, wherein the first counter balance wire is disposed so as to pass through the first link plate A part, and the first compression spring is disposed so as to be fitted around the outer circumference of the first link shaft along the longitudinal direction of the first link shaft.

In the torque-free robot arm, the first link may include a first counter balance wire roller disposed between the first link plates and the first pressing flange so as to guide the first counter balance wire while coming into close contact with the first counter balance wire.

In a preferred embodiment of the present invention, the torque-free robot arm may further include a second link rotatably connected at one end thereof to the first link to form a second joint as a rotary axis horizontal to the ground surface, the center of gravity being separated from the second joint, wherein the second link includes a second counter balancer that is disposed at one end thereof at the second joint and is disposed at the other end thereof in a longitudinal direction of the second link so that the second counter balancer compensates for the gravity of the second link when the second link is rotated about the second joint.

In the torque-free robot arm, the second counter balancer may include: a second spring block disposed spaced apart from a parallel link pulley rotatably disposed at the one end of the second link where the second joint is formed so that the second spring block can be moved along a longitudinal direction of the second link; a second counter balance wire connected at one end thereof to an outer peripheral portion of the parallel link pulley, which is deviated from the center of rotation of the parallel link pulley relative to the second joint, and fixedly mounted at the other end thereof to the second spring block so that when the second link is rotated about the second joint, the second spring block is moved along the longitudinal direction of the second link; and a second compression spring disposed between the second spring block and the parallel link pulley.

In the torque-free robot arm, the second link may include: a pair of first link plates disposed opposed to each other such that the second spring block and the second compression spring are interposed therebetween, and including a second link plate A part disposed between the parallel link pulley and the second compression spring and a second link plate B part disposed such that the second spring block is positioned between the second compression spring and the second link plate B part; and a second link shaft disposed between the second link plates, wherein the second counter balance wire is disposed so as to pass through the second link plate A part, and the second compression spring is disposed so as to be fitted around the outer circumference of the second link shaft along the longitudinal direction of the second link shaft.

In the torque-free robot arm, the second link may include a second counter balance wire roller disposed between the second link plates and the parallel link pulley so as to guide the second counter balance wire while coming into close contact with the second counter balance wire.

In a preferred embodiment of the present invention, the torque-free robot arm may further include: a second link rotatably connected at one end thereof to the first link to form a second joint as a rotary axis horizontal to the ground surface, the center of gravity being separated from the second joint; a first pressing flange disposed at the base unit and configured to transfer a rotational force applied thereto to the first link; and a double parallelogram unit including a parallel link pulley and a parallelogram wire, wherein the parallel link pulley is rotatably disposed at the one end of the second link where the second joint is formed, and wherein the parallelogram wire is arranged in pairs such that the parallelogram wire pair are fixed at one ends thereof to the first pressing flange so as to be surroundingly wound around the outer circumference of the parallel link pulley, and then is retained by a parallel link pulley retaining part disposed on the outer circumferential surface of the parallel link pulley, and wherein references of the rotation angles of the first pressing flange and the parallel link pulley respectively forming the first joint and the second joint relative to the ground surface are formed identically.

In the torque-free robot arm, one of the parallelogram wire pair may be wound around the outer circumferences of the first pressing flange and the parallel link pulley in a clockwise direction, and the other may be wound around the outer circumferences of the first pressing flange and the parallel link pulley in a counter-clockwise direction.

In the torque-free robot arm, the second link may include a second counter balancer that is disposed at one end thereof at the second joint and is disposed at the other end thereof in a longitudinal direction of the second link so that the second counter balancer compensates for the gravity of the second link when the second link is rotated about the second joint, wherein a parallel wrist pulley is disposed at the other end of the second link to form a third joint that is in parallel with the second joint, and wherein in order for the double parallelogram unit to match the reference of the rotation angle of the parallel wrist pulley relative to the ground surface with that of the rotation angle of the parallel link pulley and the first pressing flange relative to the ground surface, the parallelogram wire pair extend along the longitudinal direction of the second link after being retained by the parallel link pulley retaining part of the parallel link pulley, are wound at the other end thereof around the outer circumferential surface of the parallel wrist pulley, and are fixedly retained by a parallel wrist pulley retaining part formed on the outer surface of the parallel wrist pulley in such a manner that one of the parallelogram wire pair is wound around the outer circumference of the parallel wrist pulley in a clockwise direction and the other is wound around the outer circumference of the parallel wrist pulley in a counter-clockwise direction.

In the torque-free robot arm, a wrist link may be disposed at an outer side of the parallel wrist pulley and an end effector unit is mounted thereto.

In the torque-free robot arm, the base unit may include a first joint having a rotary axis perpendicular to the ground surface.

In another aspect, the present invention provides a torque-free robot arm including: an end effector unit; a wrist link having one end to which the end effector unit is mounted and the other end that is connected to a link motor for producing a rotational force about a rotary axis horizontal to the ground surface and perpendicular to the longitudinal direction; and a wrist counter balancer which includes: a wrist compression spring disposed so as to confront the end effector with the link motor interposed between the wrist compression spring and the end effector, and disposed perpendicular to a rotary axis of the wrist link; a wrist counter balance wire fixed at one end thereof to the wrist link; a wrist wire guide including a wrist wire roller part configured to guide the wrist counter balance wire while contacting with the wrist counter balance wire; and a wrist spring block that is brought into close contact with one end of the wrist compression spring and is connected with the other end of the wrist counter balance wire passing through the wrist compression spring.

In still another aspect, the present invention provides a torque-free robot arm including: a base unit; a first link rotatably connected at one end thereof to the base unit to form a first joint as a rotary axis horizontal to the ground surface, the center of gravity being separated from the first joint; a first link motor disposed at the base unit and configured to rotate the first link; a power transmission unit including a tendon base pulley that is connected to the first link motor and is configured to receive a rotational force produced from the first link motor, wherein the first link includes a first link plate including a first link plate A part and a first link plate B part, which are disposed spaced apart from each other, and a first link shaft disposed between the first link plate A part and the first link plate B part, and wherein a tendon link pulley is disposed at the other end of the first link to form a second joint as a rotary axis that is in parallel with the first joint; and a tendon-driven wire configured in pairs, wherein the tendon-driven wire is fixedly mounted at one end thereof to the tendon base pulley, and is retained by a tendon link pulley retaining part formed on the outer surface of the tendon link pulley after being wound around the tendon base pulley and then a tendon link pulley, in such a manner that one of the tendon-driven wire pair is wound around the outer circumferences of the tendon base pulley and the tendon link pulley in a clockwise direction and the other is wound around the outer circumferences of the tendon base pulley and the tendon link pulley in a counter-clockwise direction.

In yet another aspect, the present invention provides a torque-free robot arm including: a base unit; a first link rotatably connected at one end thereof to the base unit to form a first joint as a rotary axis horizontal to the ground surface, the center of gravity being separated from the first joint, wherein the first link includes a first counter balancer that is disposed at one end thereof at the first joint and is disposed at the other end thereof in a longitudinal direction of the first link so that the first counter balancer compensates for the gravity of the first link when the first link is rotated about the first joint; a second link rotatably connected at one end thereof to the first link to form a second joint as a rotary axis horizontal to the ground surface, the center of gravity being separated from the second joint; and a double parallelogram unit which includes: a parallel base bar that is arranged perpendicular to the center of a first joint and includes a parallel base bar connection part positioned spaced apart, in a radial direction, from the center of the first joint along the longitudinal direction of the parallel base bar; a parallel link bar that is arranged perpendicular to the center of a second joint and includes a first parallel link bar connection part positioned spaced apart, in a radial direction, from the center of the second joint along the longitudinal direction of the parallel link bar; and a parallelogram rod that includes a parallelogram base rod connected at both ends thereof to the parallel base bar connection part and the first parallel link bar connection part, respectively, wherein references of the rotation angle of the parallel base bar and the parallel link bar respectively disposed at the first joint and the second joint relative to the ground surface are formed identically.

In the torque-free robot arm, the second link may include a second counter balancer that is disposed at one end thereof at the second joint and is disposed at the other end thereof in a longitudinal direction of the second link so that the second counter balancer compensates for the gravity of the second link when the second link is rotated about the second joint, wherein a third joint that is disposed at the other end of the second link, the third joint being in parallel with the second joint, wherein the double parallelogram unit further includes a parallel wrist bar that is arranged perpendicular to the center of the third joint and includes a parallel wrist bar connection part positioned spaced apart, in a radial direction, from the center of the third joint along the longitudinal direction of the parallel wrist bar, and wherein the parallelogram rod includes a parallelogram link rod configured to interconnect the parallel wrist bar connection part and a second parallel link bar connection part disposed at the parallel link bar so as to be opposed to the first parallel link bar connection part with the center of the second joint positioned between the first parallel link bar connection part and the second parallel link bar connection part.

Advantageous Effects

According to the torque-free robot arm having the configuration as described above have the following advantageous effects.

First, the torque-free robot arm according to the present invention achieves gravity compensation of the robot arm to alleviate torque loads at joints as connection parts of links to minimize a rotational force so that the accurate motion of the robot arm can be performed.

Second, the torque-free robot arm according to the present invention achieves gravity compensation of the robot arm to alleviate torque loads at joints as connection parts of links to minimize a rotational force so that the selection width of the motors according to a reduction in an output load can be increased, thereby remarkably reducing the manufacturing cost and thus ensuring economic efficiency.

Third, the torque-free robot arm according to the present invention match reference planes for a multi-degree-of-freedom (multi-DOF) link structure through a double parallelogram unit to minimize gravity compensation torques to significantly reduce the manufacturing cost and implement a rapid drive.

Fourth, the torque-free robot arm according to the present invention enables a stable gravity compensation and compact structure through counter balancers of various forms so that excellent gravity compensation can be achieved at wrist links and the like, which require compactness.

Fifth, the torque-free robot arm according to the present invention can provide a structure which reduces a load of the robot mass at links through a tendon-driven structure so that a stable and rapid motion can be implemented and the manufacturing cost can be reduced.

Sixth, the torque-free robot arm according to the present invention enables the design of a compact robot arm through minimization of its size and volume, thereby maximizing its utilization in service robots and the like.

Seventh, the torque-free robot arm according to the present invention implement a smoother and direct reference position matching operation of the parallelogram unit through links besides wires.

While the present invention has been described in connection with the exemplary embodiments illustrated in the drawings, they are merely illustrative embodiments, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should be defined by the technical spirit of the appended claims.

BRIEF DESCRIPTION OF THE DRAWINGS

The above and other objects, features and advantages of the present invention will be apparent from the following detailed description of the preferred embodiments of the invention in conjunction with the accompanying drawings, in which.

BEST MODE FOR CARRYING OUT THE INVENTION

Now, preferred embodiments of a torque-free robot arm according to the present invention will be described hereinafter in detail with reference to the accompanying drawings.

Figure 24:
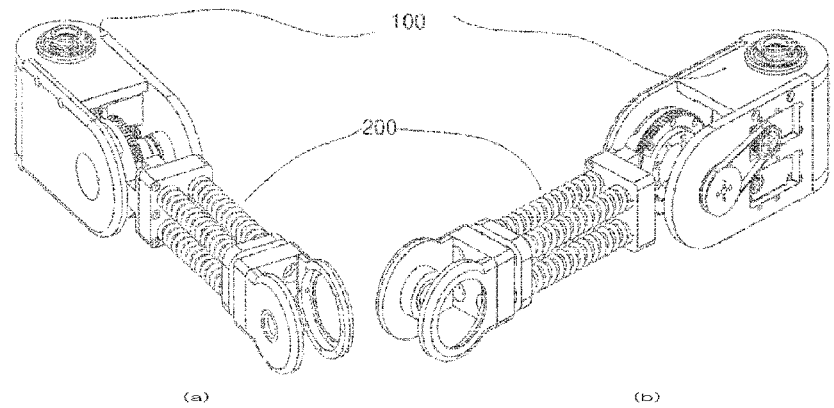
FIGS. 24 to 26 are partial perspective views illustrating a base unit and a first link, a second link, and a wrist link.
Figure 25:
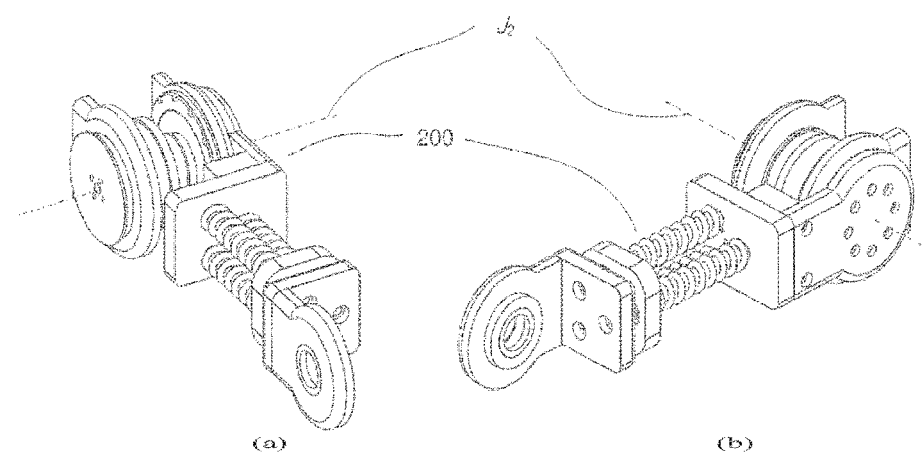
Figure 26:
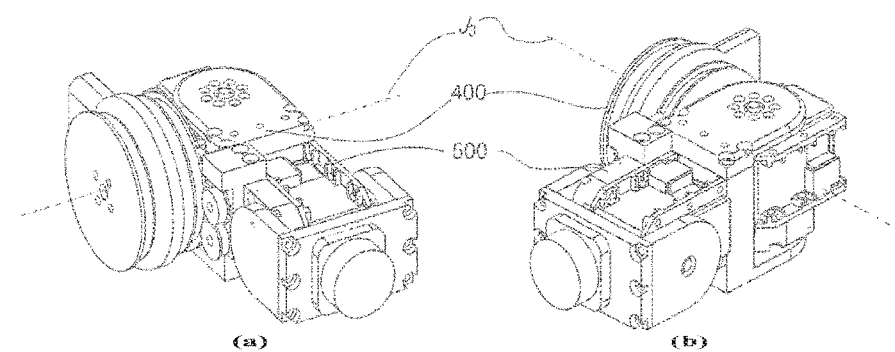

A torque-free robot arm 10 according to an embodiment of the present invention can achieve a structure in which a plurality of links is connected with each other. FIGS. 24 to 26

Figure 27:
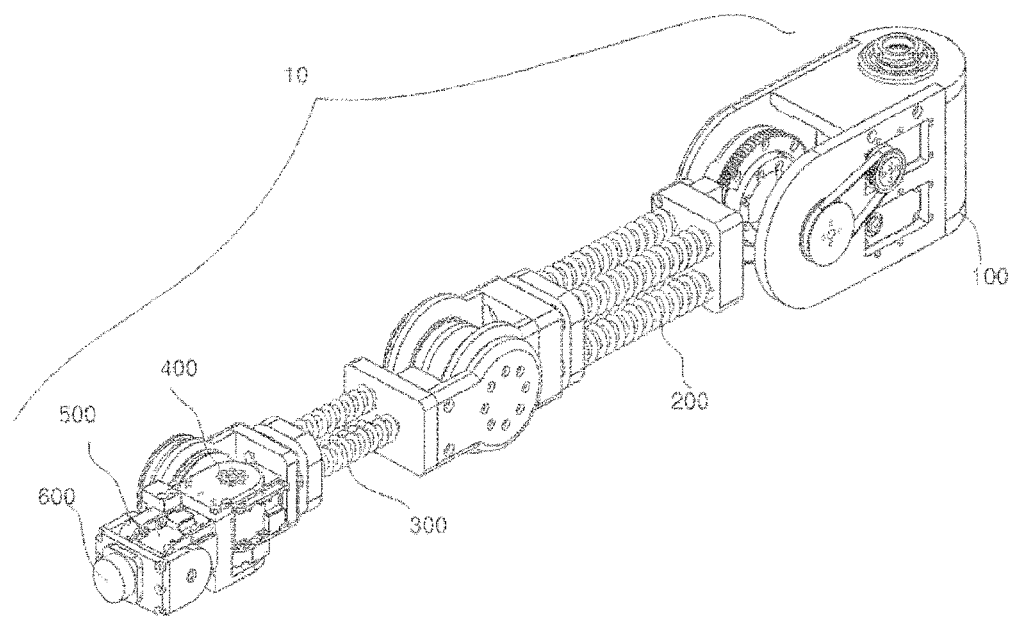
FIGS. 27 and 28 are perspective views illustrating a torque-free robot arm according to an embodiment of the present invention.
Figure 28:
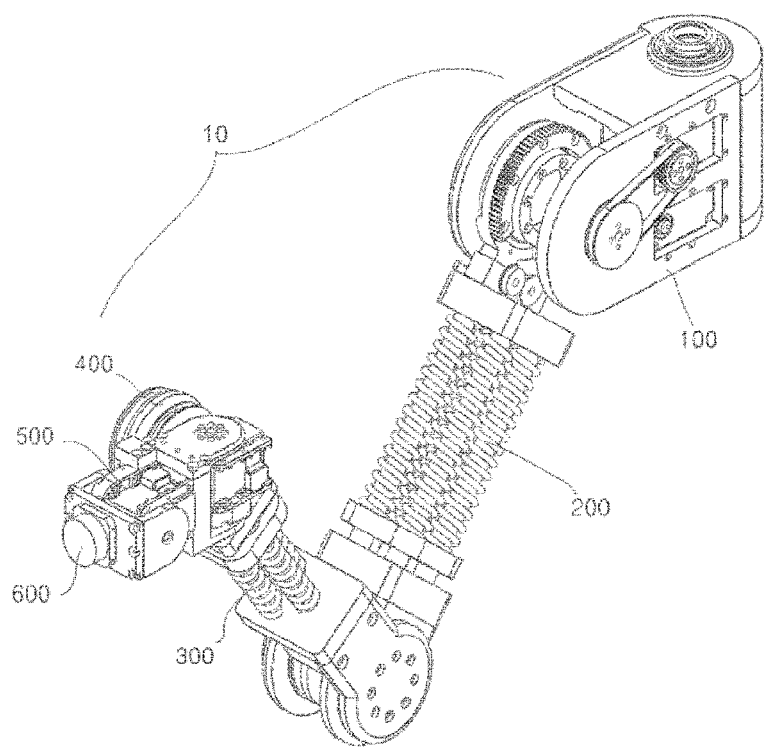

FIGS. 24 to 26 are partial perspective views illustrating a base unit and a first link, a second link, and a wrist link, and FIGS. 27 and 28 are perspective views illustrating a torque-free robot arm according to an embodiment of the present invention.

A torque-free robot arm 10 according to this embodiment includes a base unit 100, a first link 200, a second link 300, a wrist main link 400, and a wrist sub link 500. The torque-free robot arm 10 has a structure in which an end effector 600 that can be implemented as a roll motor or a gripper is disposed at an end of the wrist sub link 500. In this embodiment, the end effector takes a structure in which it is implemented as the roll motor and an additional gripper (not shown) is attached to the roll motor. However, such a structure is merely an example of the present invention, and the present invention is not limited thereto.

The torque-free robot arm 10 according to this embodiment has a total of seven degrees of freedom (DOF). Although it has been described in this embodiment that a joint structure consists of six active joints and one passive joint including the following seven degrees of freedom (DOF) structure: roll-pitch-pitch-pitch (passive joint)-roll-pitch-roll, but the joint structure is not limited thereto. In addition, the torque-free robot arm 10 of the present invention may include a double parallelogram unit (DPU), which will be described later. In the torque-free robot arm 10, since a third joint that interconnects the second link and the wrist link has been configured as a passive joint through the cooperative operation with the first link and the second link to achieve gravity compensation of a wrist link (a wrist main link and a wrist sub link), a reference plane formed by the wrist link connected to the second link through the third joint is always moved in a direction perpendicular to the ground surface. Although such a double parallelogram unit (DPU) is configured to achieve the gravity compensation for various pitch joints, it is merely an example and various modifications can be made, such as being configured as a single parallelogram unit or a plurality of parallelogram units that are consecutively operated in cooperation with each other to achieve the gravity compensation. In addition, in this embodiment, the torque-free robot arm 10 may be designed such that a cross roller bearing is inserted into joints including a rotary axis perpendicular to the ground surface, i.e., the base joint and the fourth joint to support a moment load due to gravity.

First, the base unit 100 of the torque-free robot arm 10 according to an embodiment of the present invention includes a left base frame 110, a center base frame 120, and a right base frame 130. The base unit 100 is assembled in such a manner that the left base frame 110 and the right base frame 130 are disposed opposed to each other with the center base frame 120 interposed therebetween to define a predetermined space therebetween. A first link motor 150 is disposed in the internal space to produce a rotational force for rotating the first link and/or the second link. The first link motor 150 includes a first link motor A 151 and a first link motor B 152. The first link motor A 151 forms a tendon-driven structure to provide a rotational force for rotating the second link about a rotary axis of a second joint, and the first link motor B 152 provides a rotational force for rotating the first link about a rotary axis of a first joint. Here, although the first link motor 150 has been represented simply, various modifications can be made, such as having a structure in which a speed reducer is embedded therein or a separate speed reducer is connected thereto, if necessary, or having a double-motor structure in which a single link motor is provided and a mechanism structure for interrupting the transfer of the rotational force is additionally attached to the link motor so that the link motor acts as a single power source.

Further, the base unit 100 may have a position-fixing structure, but has a structure which includes a separate rotary axis in this embodiment. The center base frame 120 of the base unit 100 may include a base joint Jb. As used herein, the term "joint" refers to an element that forms the center of a rotary axis to establish the interconnection between links.

Figure 1:
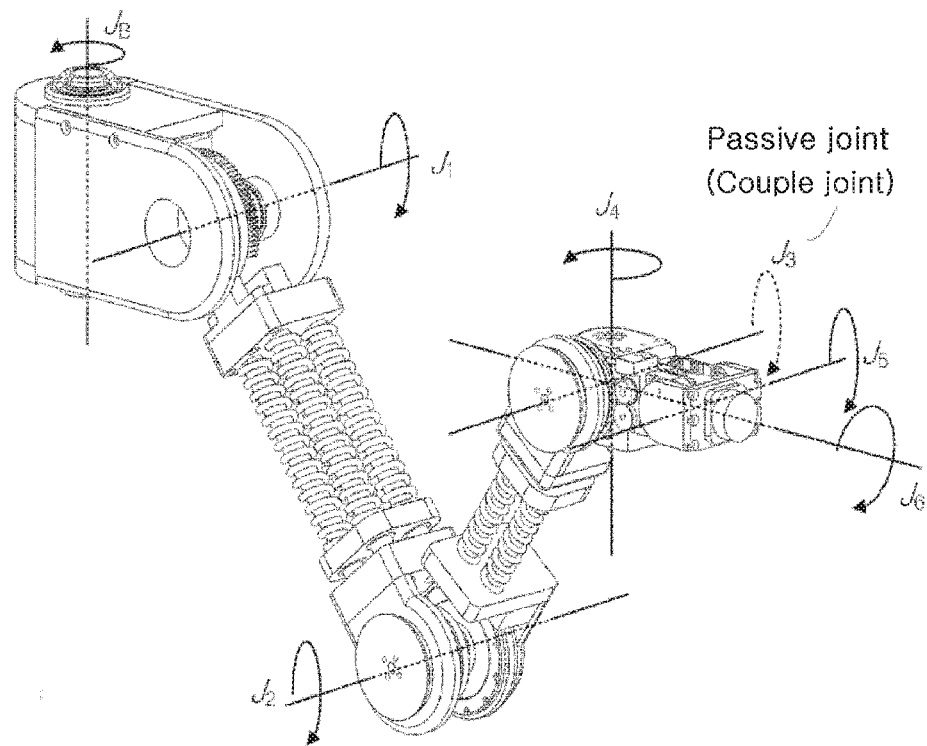
FIG. 1 is a schematic perspective view illustrating a torque-free robot arm according to an embodiment of the present invention.
Figure 2:
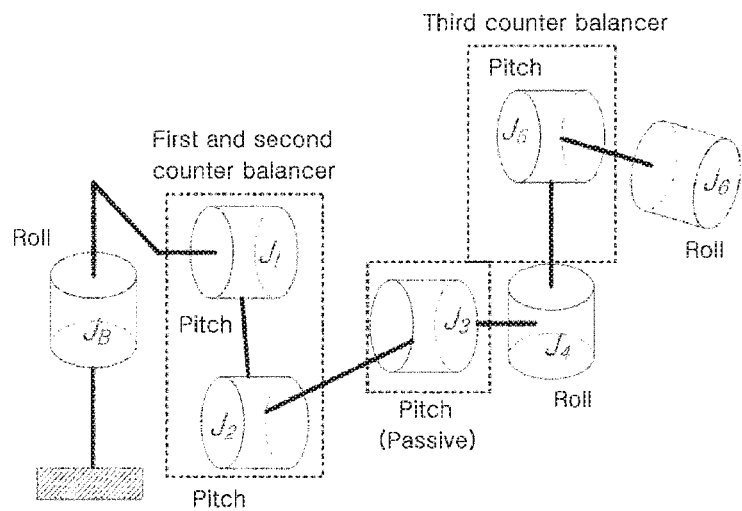
FIG. 2 is a diagrammatic view illustrating a configuration of joints of a torque-free robot arm according to an embodiment of the present invention.
Figure 3:
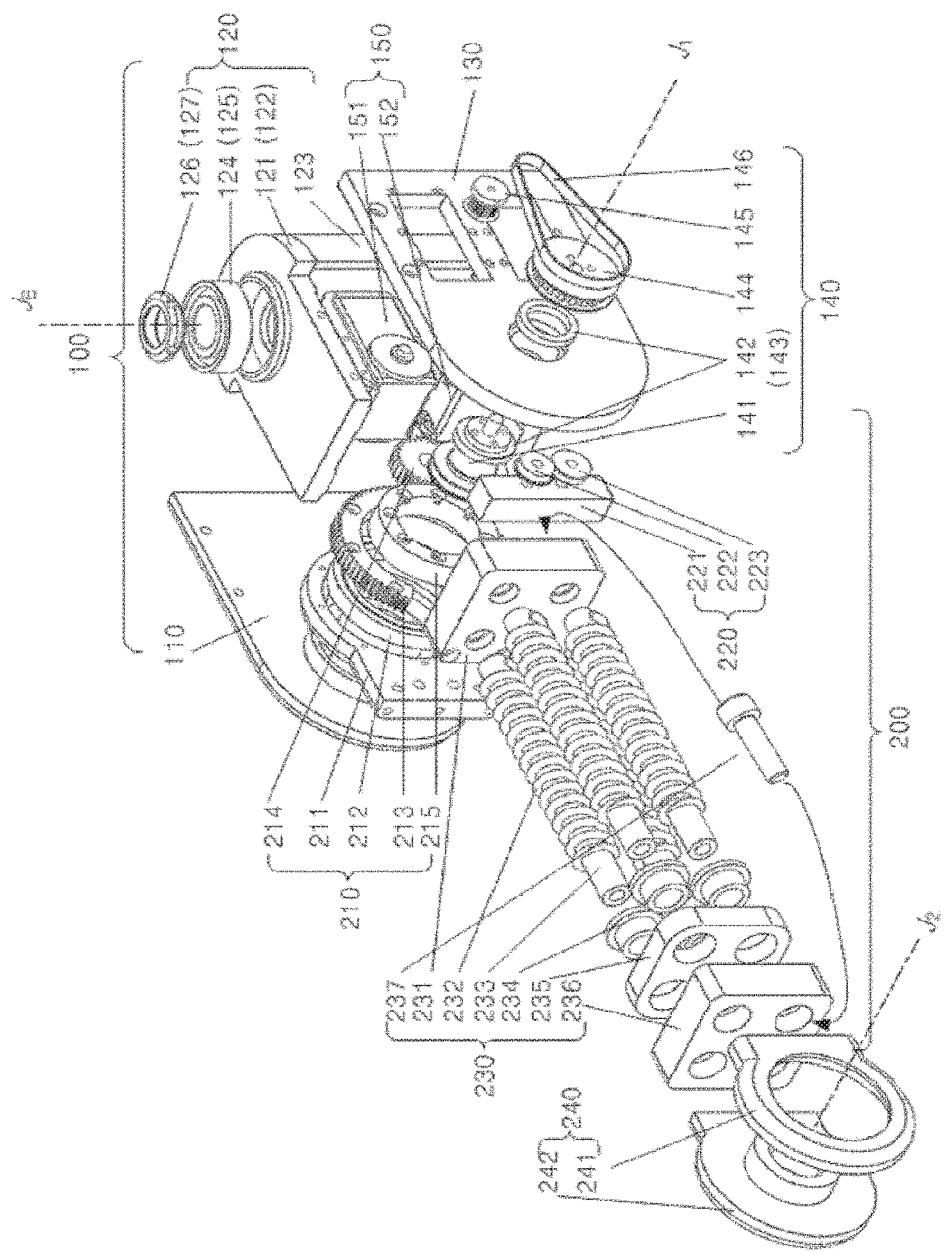
FIG. 3 is a schematic exploded perspective view illustrating a base unit and a first link of a torque-free robot arm according to an embodiment of the present invention.

The center base frame 120, which is a reference part of the entire robot arm, includes an upper frame plate 121, a lower frame plate 122, and a side frame housing 123. The upper frame plate 121 and the lower frame plate 122 are disposed with the side frame housing 123 interposed therebetween. The upper frame plate 121 and the lower frame plate 122 have a through-hole formed therein so as to allow an angular contact bearing 124, 125 and a bearing nut 126, 127 to be inserted thereto. A shaft (not shown) is penetratingly mounted in the through-hole so that the base unit 100 can be held to perform a roll movement about a base joint Jb as a rotary axis perpendicular to the ground surface. The reference numerals 122,125 and 127 denote the lower frame plate, the angular contact bearing and the bearing nut which are disposed in the lower frame plate. Although not shown in FIG. 3, the lower frame plate 122, it can be fully understood from the drawing that the angular contact bearing 125 and the bearing nut 127 are disposed symmetrically with the upper frame plate 121 and the associated elements disposed in the upper frame plate 121. In addition, the shaft may be operated manually or automatically to receive a rotational force.

The left base frame 110 includes a first link base joint connection part 210 for enabling the relative rotation between the base unit 100 and the first link 200, which will be described later, about the first joint J1. The first link base joint connection part 210 includes a first link base joint connection body 211, a ring gear 212, a first cross roller bearing 213, and a first pressing flange 215. The first link base joint connection body 211 is mounted to enable the relative rotation with the left base frame 110 of the base unit 100. The first link base joint connection body 211 has the ring gear 212 fixedly mounted thereon and is fixedly connected at an end thereof to a first link plate part A 231 of the first link 200, which will be described later. The first pressing flange 215 is fixedly disposed on the left base frame 110, and the ring gear 212 is disposed between the first pressing flange 215 and the first cross roller bearing 213 to enable the smooth relative rotation between the first pressing flange 215 and the ring gear 212, ultimately between the left base frame 110 and the first link base joint connection body 211, more specifically between the base unit 110 and the first link 200. The first pressing flange 215 has a width larger than that of the ring gear 212 to enable a parallelogram wire, which will be described later, to be wound therearound.

The ring gear 212 meshes with a pinion gear 214. The pinion gear 214 is connected to a rotary shaft of the first link motor B 152 of the first link motor 150 to transfer a predetermined produced rotational force to the ring gear 212 so that the ring gear 212 can be rotated about the first joint J1 of the first link 200. The ring gear 213 takes a structure which has an arcuate shape so that when the relative rotation between the base unit 100 and the first link 200 about the first joint is performed, a connection direction of the parallelogram wire which will be described is guided. This is merely an example, and the present invention is not limited thereto.

The first link base joint connection body 211 is engaged with the first link plate A part 231 of the first link 200, which will be described later. The first link plate A part 231 is disposed spaced apart from the first link plate B part 236, and a first link shaft 233 and a first counter balancer which will be described are disposed between the first link plate A part 231 and the first link plate B part 236.

The base unit 100 may further include a power transmission device 140. The power transmission device 140 has a structure in which a rotational force produced from the first link motor A 151 of the first link motor 150, i.e., a rotational force for rotating the second link 300 disposed at the second joint J2 formed at an end of the first link 200 connected to the base unit 100 about the second J2 is transferred. In other words, a rotational force produced from the first link motor B 152 of the first link motor 150 rotates the first link 200, and the rotational force produced from the first link motor A 151 of the first link motor 150 rotates the second link 300 connected to the first link 200. By virtue of this structure, a power source that drives the links is disposed at the base unit so that a load and a torque load applied to the links rotating about the joints can be reduced, thereby enabling smooth, accurate and stable operation and manufacture.

The power transmission device 140 includes a first timing pulley 145, a timing belt 146, a second timing pulley 144, and a tendon base pulley 141. The first timing pulley 145 is coaxially connected to the first link motor A 151, and the power transmission is performed between the first timing pulley 145 and the second timing pulley 144, which are disposed spaced apart from each other through the timing belt 146. In this case, a constant reduction ratio can be applied due to a difference in the number of teeth, i.e., the radius between the second timing pulley 144 and the first timing pulley 145. The second timing pulley 144 is connected to the tendon base pulley 141. The tendon base pulley 141 has a structure which is stably rotatably mounted to the right base frame 130 through deep groove ball bearings.

Figure 4:
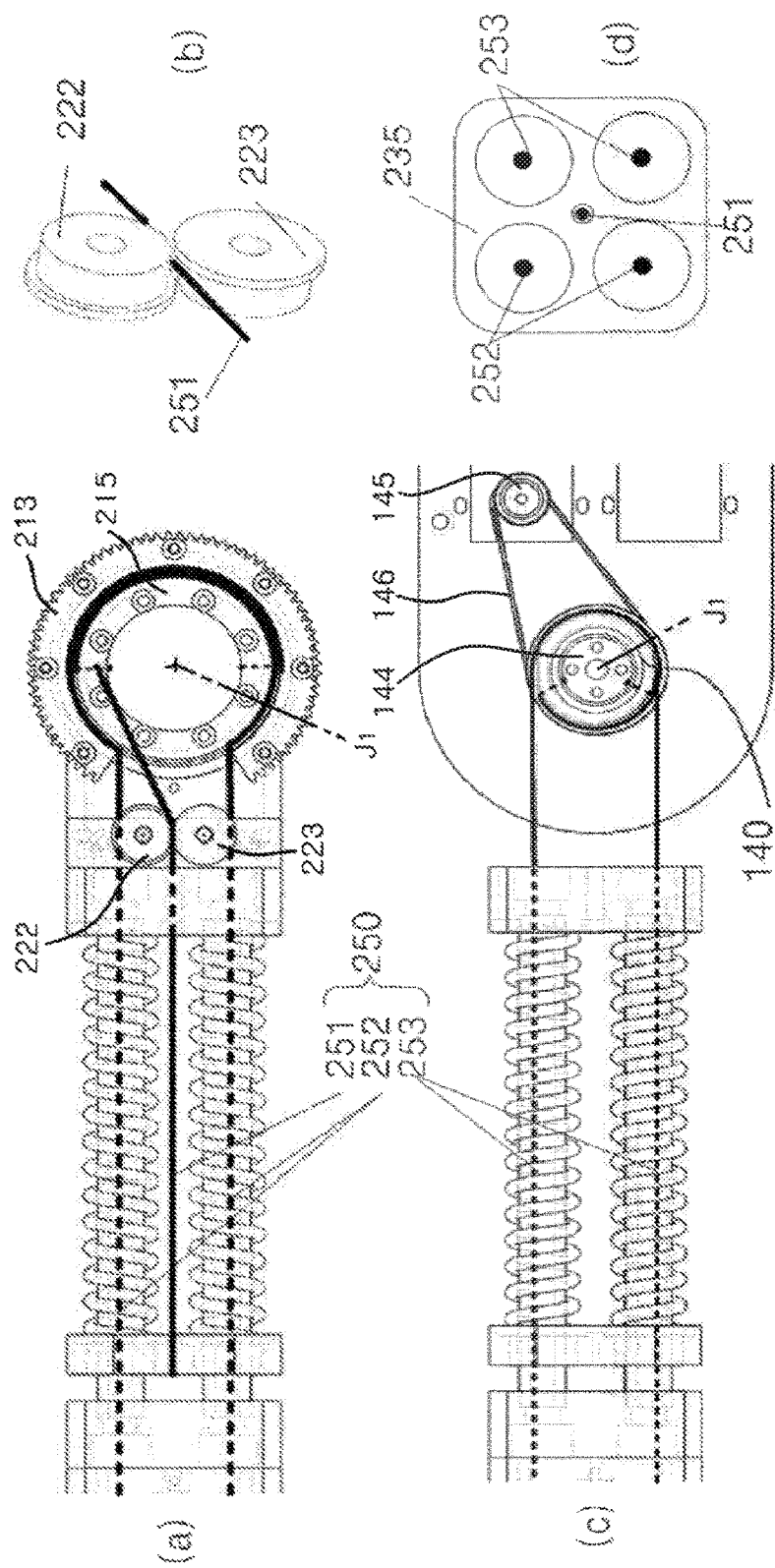
FIG. 4 illustrates a partial side view, a partial perspective view, and a partial front elevational view of a double parallelogram unit, a counter balancer, and a tendon-driven mechanism in FIG. 3.
Figure 5:
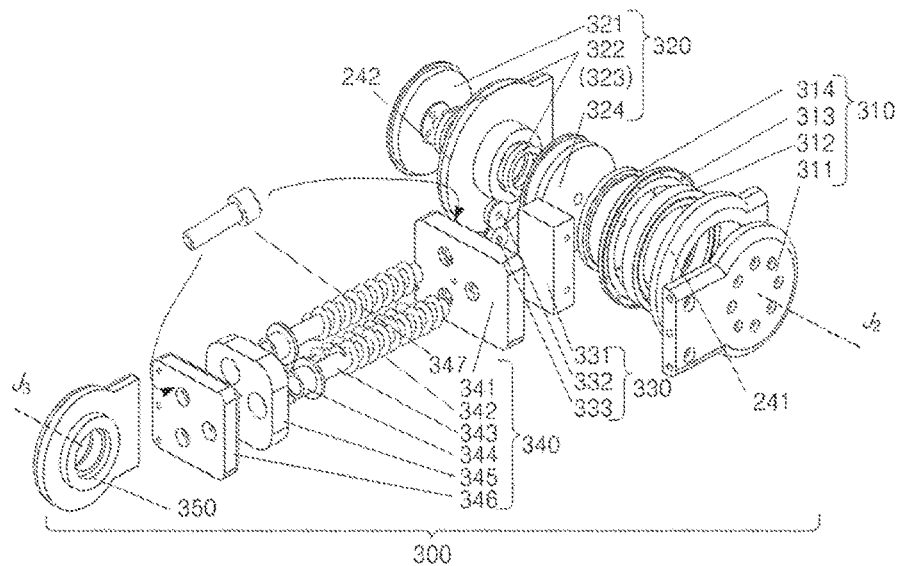
FIG. 5 is a schematic exploded perspective view illustrating a base unit and a second link of a torque-free robot arm according to an embodiment of the present invention.
Figure 6:
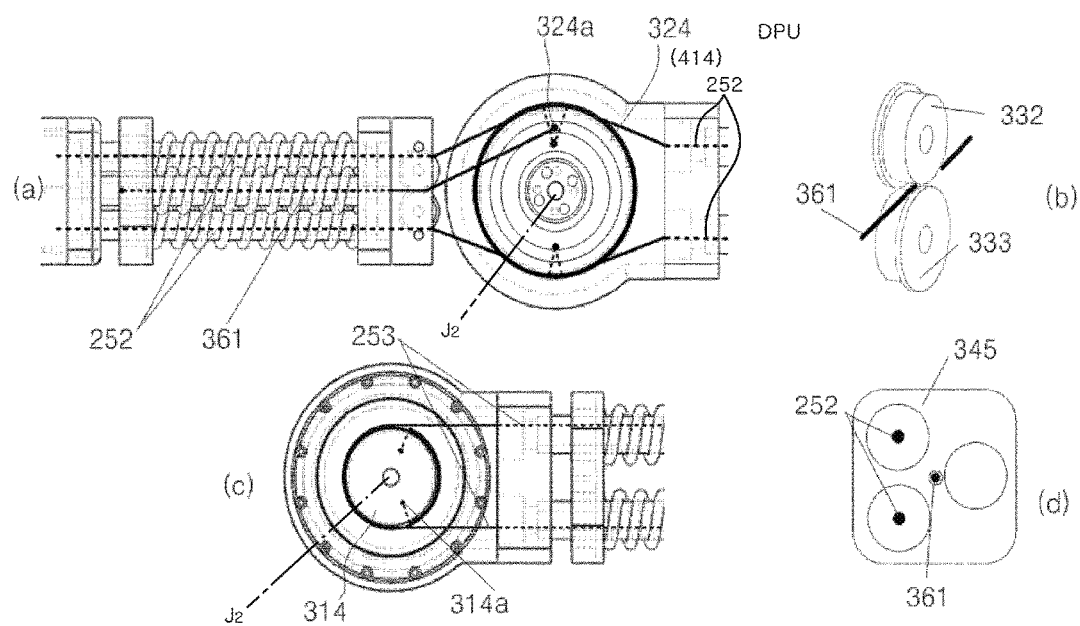
FIGS. 6(a) to 6(d) are a partial side view, a partial perspective view, and a partial front elevational view of a double parallelogram unit and a counter balancer in FIG. 5.

The tendon base pulley 141 has a structure in which a tendon-driven wire 253 forming a tendon-driven structure is wound around the outer circumference of the tendon base pulley 141. The tendon-driven wire 253 is configured to be disposed in pairs in such a manner that it is fixedly mounted at one end thereof to the tendon base pulley 141, and then is wound around the tendon base pulley 141 and is connected to a tendon link pulley 314 disposed at the second joint J2 positioned at an end of the first link 200 while passing through the first link 200. That is, as shown in FIGS. 4(c) and 6, the tendon-driven wire 253 has a structure in which it is disposed in pairs in such a manner that the tendon-driven wire pair is wound around the tendon base pulley in directions opposite to each other, i.e., one tendon-driven wire 253 is wound around the outer circumference of the tendon base pulley in a clockwise direction more than once and the other tendon-driven wire 253 is wound around the outer circumference of the tendon base pulley in a counter-clockwise direction more than once, is wound around the tendon link pulley 314 disposed the second joint J2 after passing through the first link plates 231 and 236, and the first link shaft 233 of the first link 200, and a first spring block 235 of a first counter balancer 230, and then is retainingly fixed by a tendon link pulley retaining part 314a. The position of the tendon link pulley retaining part may be changed besides a side of the tendon link pulley 314. By virtue of this configuration, a clockwise/counter-clockwise rotational force produced from the first link motor A 151 is transferred to the tendon base pulley 141 of the power transmission device 140 and then is transferred to the tendon link pulley 314 through the tendon-driven wire 253 connected to the tendon base pulley 141 so that the rotational force is transferred to the second link 300 to cause the second link 300 to be rotated about the second joint J2 connected to the first link 200.

Figure 23:
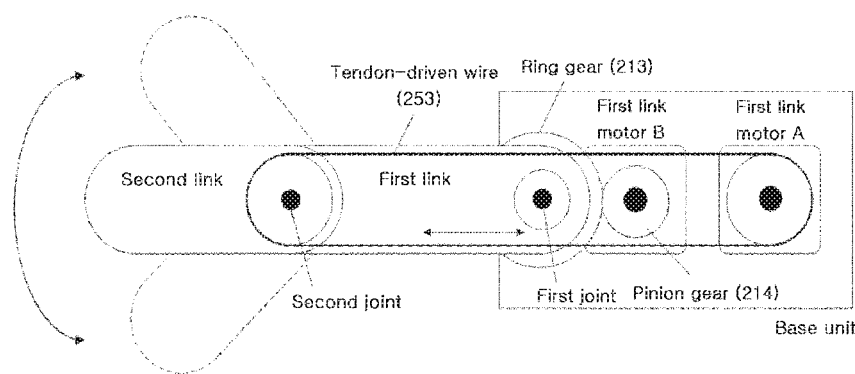
FIG. 23 is a conceptual diagram illustrating a tendon-driven structure.

FIG. 23 is a conceptual diagram illustrating a tendon-driven structure.

The tendon-driven structure is configured to transmit a power for rotating the second link 300 connected to the second joint J2 as an end of the first link 200 using the first link motor A disposed at the base unit 100 so that a load at the first link can be reduced to ensure smooth operation performance and enable proper selection of the motor, thereby remarkably reducing the manufacturing cost. In addition, the tendon-driven wire is disposed in the first link shaft in a hollow shape so that it is blocked from being exposed to the outside, thereby performing a more stable operation.

The first link 200 is rotatably connected at one end thereof to the base unit 100 so as to be disposed at a first joint J1 as a rotary axis horizontal to the ground surface, and a center of gravity of the first link is spaced apart from the first joint in such a manner as to be positioned between the first joint J1 and the second joint J2. The first link 200 includes the first link plates 231 and 236, and the first link shaft 233 as described above. The first link plates 231 and 236 are the first link plate A 231 and the first link plate B 236. The first link plate A 231 and the first link plate B 236 are configured to be disposed spaced apart from each other. The first link shaft 233 is interposed between the first link plate A 231 and the first link plate B 236. The first link shaft 233 is disposed in plural numbers in the embodiment and has a hollow shaft structure. The first link shaft 233 has a first hollow bolt 237 disposed at both ends thereof so that stable mounting state of the link shaft 233 to the first link plates can be formed.

One end of the first link 200, which is connected to the base unit 100, is disposed at the first joint J1, and the other end of the first link 200 is disposed at the second joint J2 connected to the second link 300. That is, by virtue of this configuration, a compact space design is enabled along with the improvement of the performance owing to a reduction in the manufacturing cost and the weight. This is merely an example, and the present invention is not limited thereto but various design modifications can be made, such as being formed as a single hollow structure and the like.

A link joint connection part 240 is disposed at an end of the first link plate B part 236. The link joint connection part 240 includes a link joint connecting-tendon connection part 241 and a link joint connecting-parallel connection part 242. The link joint connecting-tendon connection part 241 has a structure in which it is connected to a second counter balancer 340 which will be described later, and the link joint connecting-parallel connection part 242 has a structure in which it is connected to the double parallelogram unit (DPU). Here, although the phase "double parallelogram unit" has been used in this embodiment, it is merely an exemplary expression of an element. In addition, it will be obvious from the following description that the parallelogram unit of the present invention may have a structure in which the number of the parallelogram structures connected is not limited to the structure in this embodiment, but several parallelogram structures are consecutively connected to each other.

The first link 200 includes a first counter balancer 230. The first counter balancer 230 is connected at one end thereof to the first joint J1 and extends at the other end in a longitudinal direction of the first link 200 so that the first counter balancer compensates for the gravity of the first link when the first link is rotated about the first joint. The first counter balancer 230 includes a first spring block 235, a first counter balance wire 251, and a first compression spring 232. The first spring block 235 has a structure in which it is spaced apart from the first pressing flange 215 disposed at the base unit 100 so that the first spring block 235 can be moved along a longitudinal direction of the first link 100. That is, the first spring block 235 is disposed between the first link plate A part 231 and the first link plate B part 236 in such a manner that the first link shaft 233 interposed the first link plate A part 231 and the first link plate B part 236 passes through the first spring block 235 and the first spring block 235 can be moved along the first link shaft 233. A first linear bush 234 is inserted into a through-hole formed in the first spring block 235 so that it can be smoothly moved on the first link shaft 233.

The first compression spring 232 is disposed between the first spring block 235 and the first pressing flange 215. The first counter balance wire 251 is connected at one end thereof to an outer peripheral portion of the first pressing flange 215, which is deviated from the center of rotation of the first pressing flange 215 relative to the first joint J1, and is fixedly mounted at the other end thereof to the first spring block 235 so that when the first link 200 is rotated about the first joint J1, the first spring block 235 is moved along the longitudinal direction of the first link 200, i.e., along the longitudinal direction of the first link shaft 233 in this embodiment. The first counter balance wire 251 is connected to the first spring block 235 while passing through the first link plate A part 231, and the length of the first counter balance wire 251 is preferably set to be a length forming a predetermined state in which the first compression spring 232 is elastically compressed at an initial stage.

In addition, the first link 200 may further include a first counter balance wire roller 220 for guiding smooth movement of the first counter balance wire 251. The first counter balance wire roller 220 includes a first bearing plate 221, and first flange bearings 222 and 223. The first bearing plate 221 is connected to the first link plate A part 231. The first bearing plate 221 is rotatably connected to a side of the first link plate A part 231. The first counter balance wire 251 passes between two first flange bearings 222 and 223 in order to minimize the friction between the first link plate A part 231 and the first counter balance wire 251 and form a stable wire movement structure. Two protruded flanges are respectively formed at one ends of the two first flange bearings in such a manner as to be in a staggered arrangement relative to each other so that the first counter balance wire 251 is prevented from escaping from a predetermined path between two first flange bearings.

In the present invention, the torque-free robot arm includes a counter balancer as a gravity compensation mechanism for compensating for torques due to the robot mass, which are generated depending on the position of the robot arm. The mechanical operation process and characteristics of the gravity compensation mechanism will be described hereinafter.

Figure 9:
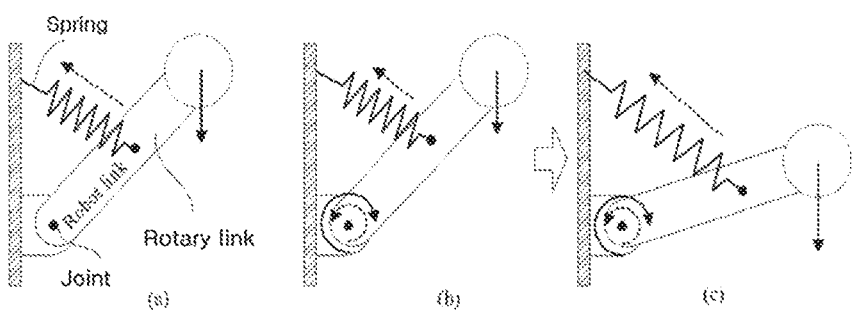
FIGS. 9 to 11 are conceptual diagrams illustrating the operation mechanism of a counter balancer.
Figure 10:
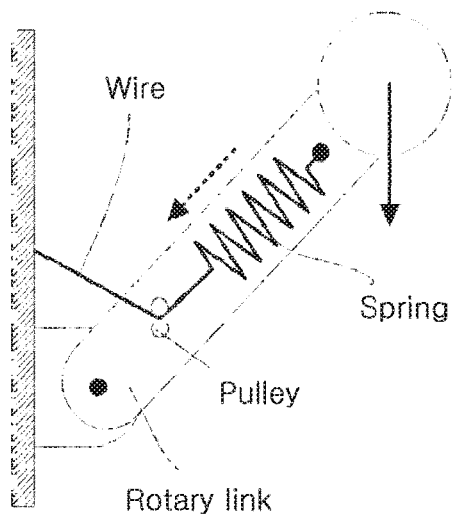

The structure of the counter balancer for gravity compensation implements a gravity compensation mechanism as shown in FIG. 9. In the case where an tension spring is connected between a rotary link and a fixed end, when the robot arm is rotated by gravity, a spring force is generated in a direction opposite to the rotation direction of the robot arm and the spring is extended or compressed according to the rotational displacement of the robot arm to cause the length of the spring to be changed so that torques compensated depending on a change in joint torque by rotation can be adjusted by the spring. The gravity compensation mechanism based on the spring is applied as a modification as shown in FIG. 10 in case of the torque-free robot arm 10 according to this embodiment. That is, an end of the wire connected to the spring is positioned at a point different from a longitudinal direction but the spring connected to the wire through a wire guide structure is formed so as to match the longitudinal direction of the rotary link.

Figure 11:
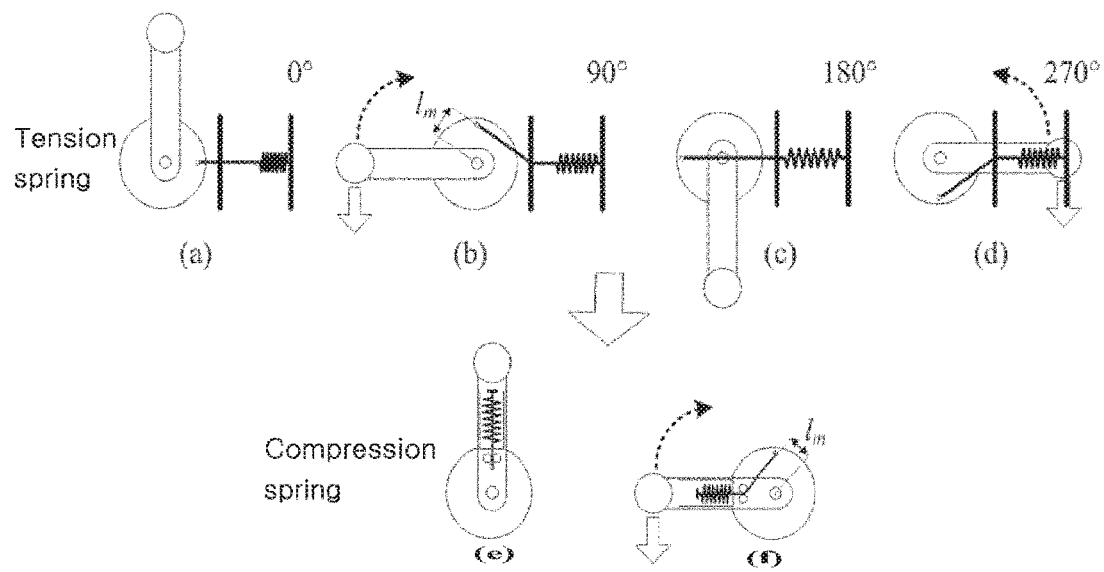

The basic operational concept of the counter balancer according to the present invention is shown in FIG. 11. The spring forming a compensation force at the counter balancer is fixed at one end thereof and is connected at the other end thereof to the wire to form an elastic deformation in the longitudinal direction of the rotary link. The wire is fixed at the other end thereof to a position spaced apart from the center of rotation of the link to cause a certain change in position according to rotation of the link. That is, when the link is rotated from 0° to 360°, torques compensated depending on a change in length of the spring and a change in moment arm length $l_m$ are changed. The spring for gravity compensation is fixedly connected at one end thereof to a reference plane and is connected at the other end thereof to the link of the robot arm through the wire. The wire is fixed at a position in which the spring force is minimum when the rotation angle of the robot arm is 0°, i.e., the robot arm is positioned perpendicular to the ground surface, i.e., horizontal to the reference plane as shown in FIG. 11(a). At this position, since the spring force is smallest, and the moment arm length $l_m$ is 0, a theoretically compensated torque is 0.

On the other hand, when the rotation angle of the robot arm is 90° as shown in FIG. 11(b), a spring force is generated and the moment arm length $l_m$ is maximum, and thus a compensated torque also is maximum. When the rotation angle of the robot arm is 180° as shown in FIG. 11(c), a spring force is maximum but the moment arm length is 0, and thus a compensated torque also is 0. When the rotation angle of the robot arm is 270° as shown in FIG. 11(d), a spring force is the same as that in FIG. 11(a). This structure is identically applied to the structure of a compression spring as shown in FIGS. 11(e) and 11(f) besides the structure of the tension spring as shown in FIGS. 11(a) to 11(d). The compression spring has a structure in which it is not fixedly connected to the reference plane unlike the tension spring, but is rotated together with the rotary link. That is, the compression spring has a structure in which one end of the wire connected to the spring is fixed to a reference point unlike the tension spring.

When the rotary link is rotated relative to the counter balancer having a compression spring structure shown in FIG. 11(e), for example, the rotary link is rotated by 90° as shown in FIG. 11(f), a tensile force is applied to the spring connected to the wire due to a change in position between the rotary link and a reference point according to the rotation of the rotary link to form a predetermined elastic deformation.

Figure 12:
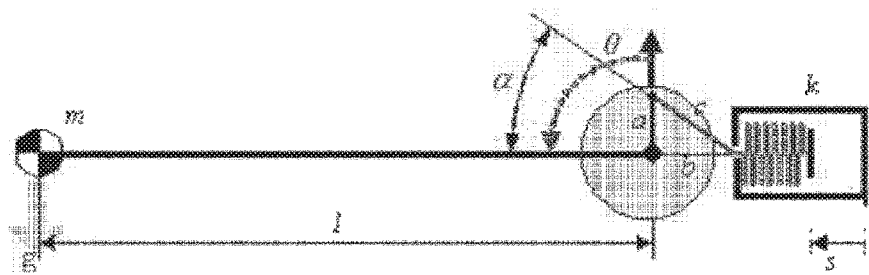
FIGS. 12 and 13 are a conceptual diagram illustrating the operation performance of a counter balancer, and a diagrammatic view illustrating the results of simulation.

Such a compression spring structure is applied to the counter balancer of the present invention and a conceptual diagram thereof is shown in FIG. 12. When a gravity compensation mechanism using a spring having a rigidity k and an initial compression length $s_i$ is applied to a robot arm having a mass m and a moment arm length l, a torque $T_g$ due to gravity applied to the robot arm is calculated by the following equation:

$$T_g(\theta) = mgl \sin \theta$$

In addition, a spring force calculation equation and a compensated torque $T_{bal}$ are expressed by the following equations:

$$F_s(\theta) = k\{s_i + c(\theta) - (b-a)\}, \quad c = \sqrt{a^2 + b^2 - 2ab\cos\theta}$$

$$T_{bal}(\theta) = bF_s(\theta)\sin\alpha, \quad \sin\alpha = a\sin\theta/c$$

Hence, the robot joints, i.e., the joints of the links of the robot arm requires only a torque $T_{req}$, which is calculated as follows:

$$T_{req}(\theta) = T_g(\theta) - T_{bal}(\theta)$$

Also, when a compensation torque $T_{bal}$ is produced which can completely compensate for a torque due to gravity, $T_{req}$ is 0, and thus the following equation can be derived from the above relationship equation and FIG. 12:

$$mgl\sin\theta = bk\{s_i + c(\theta) - (b-a)\}\frac{a\sin\theta}{c(\theta)}$$

wherein if an initial compression length $s_o$ is set to a-b, rigidity k, a, and b can be set by the following equation:

$$k = mgl/ab$$

Figure 13:
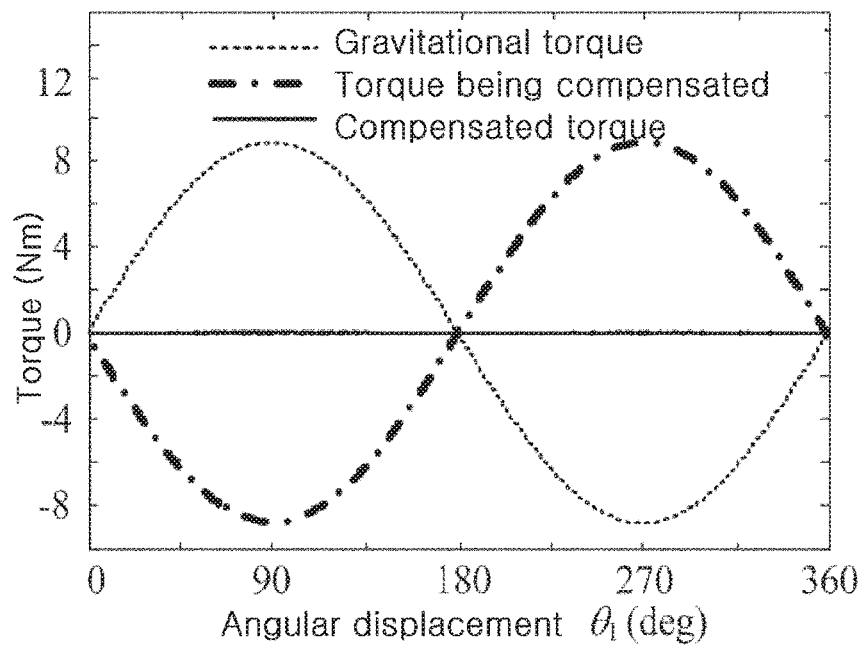

For example, when it is assumed that the gravitational acceleration is 9.8 m/s², in the case where a gravity compensation mechanism, i.e., a counter balancer in which a spring rigidity k is 11,025 N/m, an initial compression distance $s_i$ is 20 mm, and lengths a and b are 20 mm and 40 mm, respectively, is applied to a robot arm in which a mass m is 3 kg and a length l from the mass to the center of gravity is 300 mm, the results of simulation can be obtained as shown in FIG. 13. That is, when it is assumed that an original torque (gravitational torque) for driving a robot arm is denoted by a dotted line, a torque (torque being compensated; counterbalancing torque) denoted by a dashed dotted line is compensated by the counter balancer and only a torque (compensated torque; difference torque) as much as a solid line is required in order for the link of the robot arm to be moved actually. As shown in FIG. 13, it can be seen that when the counter balancer is not included in the robot arm, a considerable torque (about 8 Nm) is needed, but when the counter balancer is included in the robot arm, a required torque is 0.

Figure 29:
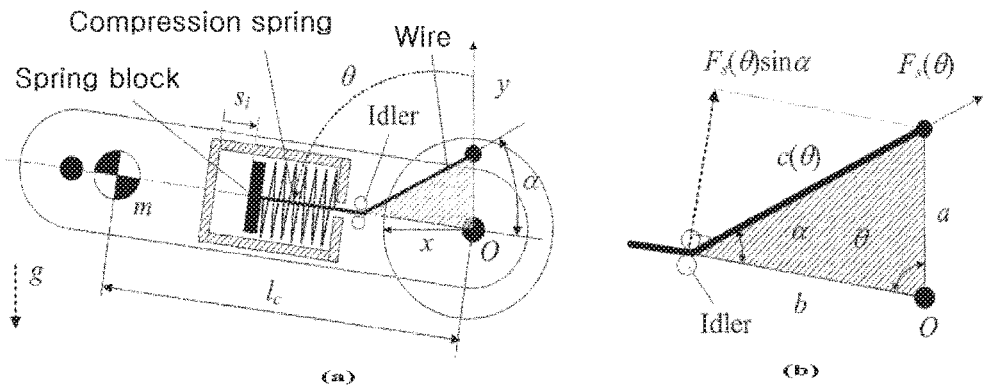
FIG. 29 illustrate another conceptual diagram of the operation performance of a counter balancer of the present invention and a diagrammatic view illustrating the results of simulation thereof.

Meanwhile, although it has been described in the above description example that the compression spring is disposed at the rear of the link, the present invention is not limited thereto. In other words, as shown in FIG. 29, various modifications of the compression spring can be made, such as having a structure in which it is disposed along the longitudinal direction of the link. Such a compression spring structure is applied to the counter balancer of the present invention. A conceptual diagram of the counter balancer is shown in FIG. 29(a) and a force relationship is shown in FIG. 29(b). In addition, the correlation between the counter balancer and the force relationship is the same as described above.

In the meantime, the double parallelogram unit (DPU) is configured as two consecutive parallelogram mechanism structures. A parallelogram wire 252 constituting this double parallelogram unit (DPU) has a structure in which it is disposed in pairs such that the first link 200 is connected to a parallel link pulley 324 disposed at the second joint J2 formed at the other end of the first link 200. The double parallelogram unit (DPU) includes a parallel link pulley 324 and a parallelogram wire 252. The parallel link pulley 324 is disposed at the second joint J2. The second link 300 has the second joint J2 formed at the other end of the first link 200 and is disposed to enable the relative rotation between the second link 300 with the first link 200. The parallel link pulley 324 is disposed at one end of the second link 300 and the other end of the first link 200, which form the second joint J2. The parallelogram wire 252 is connected at one end thereof to the first pressing flange 215 and is connected at the other end thereof to the parallel link pulley 324 so that the rotation angles of the first pressing flange 215 and the parallel link pulley 324 respectively forming the first joint and the second joint relative to the ground surface form the same reference.

More specifically, the parallelogram wire 252 arranged in pairs are fixed at one ends thereof to the first pressing flange 215 so as to be surroundingly wound around the outer circumference of the first pressing flange 215, and then passes through the first link plate A part 231. Thereafter, the parallelogram wire 252 is inserted into the first link shaft 233 of a hollow structure, passes through the first spring block 235 and the first link plate B part 236, and is wound around the parallel link pulley 324 positioned at the second joint J2. Here, the parallelogram wire 252 may have a structure in which it is consecutively connected in order to set the same rotation reference relative to the ground surface at the other end of the second link 300.

FIG. 4(d) shows a front cross-sectional view of the first spring block 235. The parallelogram wire pair 252 passing through the first link shaft 233(not shown in FIG. 4(d) and see FIG. 3) inserted into the through-holes formed in the first spring block 235 is disposed at the left side of FIG. 4(d), the first counter balance wire 251 is disposed at the center of FIG. 4(d), and the tendon-driven wire pair 253 for transferring a rotational force of the second joint to the second link connected to the first link is disposed at the right side of FIG. 4(d).

Meanwhile, the second link 300 is connected to the other end of the first link 200 to form the second joint J2. The second link 300 forms a link connection structure in which it is rotatably connected at one end thereof to the first link 200 to form a second joint J2 as a rotary axis horizontal to the ground surface and a center of gravity thereof is separated from the second joint J2. The second link 300 includes a second counter balancer 340. The second counter balancer 340 has the same structure as that of the first counter balancer 230 except that the second counter balancer 340 is formed at the second link 300. The second counter balancer 340 is connected at one end thereof to the second joint J2 and extends at the other end thereof in a longitudinal direction of the second link 300 so that when the second link 300 is rotated about the second joint J2, the gravity of the second link 300 is compensated.

First, the second link 300 is disposed coaxially with the link joint connection part 240. A link joint connection part 310 of the second link 300 is connected to the link joint connection part 240 of the first link 200. The link joint connection part 310 includes a link tendon connection side cover 311 and a tendon pressing flange 313. The link joint tendon connection part 241 of the link joint connection part 240 is interposed between the link tendon connection side cover 311 and the tendon pressing flange 313 so that the relative rotation between the first link 200 and the second link 300 can be performed. A tendon link pulley 314 is disposed to be opposed to the link tendon connection side cover 311 with the tendon pressing flange 313 interposed between the link tendon connection side cover 311 and the tendon link pulley 314. The tendon link pulley 314 is rotated together with the link tendon connection side cover 311 with it engaged with the link tendon connection side cover 311. In this case, the tendon link pulley 314 and the tendon pressing flange 313 are configured to be engaged with the second cross roller bearing 312 in such a manner that they press the inner ring and the outer ring of the second cross roller bearing 312, respectively, so that the relative rotation between the first link 200 and the second link 300 can be performed and simultaneously the second link 300 can be rotated about the second joint J2 of the second link 300 through a rotational force of the first link motor A 151 of the first link motor 150 (see FIG. 6(c)).

On the other hand, the link joint connecting-parallel connection part 242 of the first link 200 is connected to a link joint parallel connection part 320. The link joint parallel connection part 320 includes a second pressing flange 321 and a parallel link pulley 324. The second pressing flange 321 and the parallel link pulley 324 are engaged with each other with the link joint connecting-parallel connection part 242 interposed therebetween. The second pressing flange 321 is connected to the parallel link pulley 324 through the link joint connecting-parallel connection part 242. A deep groove ball bearing 322,323 is disposed between the second pressing flange 321 and the link joint connecting-parallel connection part 242 to enable the smooth relative rotation therebetween. The parallel link pulley 324 has a structure which enables the relative rotation between the parallel link pulley 324 and the link joint connecting-parallel connection part 242 about the second joint J2. The parallelogram wire 252 is wound around the parallel link pulley 324. That is, as described above, the parallelogram wire 252 formed arranged in pairs is disposed to surround the parallel link pulley 324. A parallel link pulley retaining part 324a is disposed on the outer circumferential surface of the parallel link pulley 324 so that the parallelogram wire 252 is retained by the parallel link pulley retaining part 324a. Thus, when the parallelogram wire 252 is extended, the tensile force is also transferred to the parallel link pulley 324 to cause the parallel link pulley 324 to be rotated together in a predetermined direction so that the parallel link pulley 324 can ultimately be rotated in cooperation with the first pressing flange 215 connected thereto through the parallelogram wire 252 to cause the rotation references at the first joint J1 and the second joint J2 of the first link 200 and the second link 300 to be matched with each other.

The second link 300 is rotatably connected at one end thereof to the first link 200 to form a second joint J2 as a rotary axis horizontal to the ground surface, and a center of gravity of the first link is spaced apart from the second joint in such a manner as to be positioned between the second joint J2 and a third joint J3 disposed at the other end of the second link 300. The second link 300 includes a second link plate 341,346 and a second link shaft 343. The second link plate 341, 346 includes a second link plate A 341 and a second link plate B 346. The second link plate A 341 and the second link plate B 346 are configured to be disposed spaced apart from each other.

The second link shaft 343 is interposed between the second link plate A 341 and the second link plate B 346. The second link shaft 343 is disposed in plural numbers in the embodiment and has a hollow shaft structure. The second link shaft 343 has a second hollow bolt 347 disposed at both ends thereof so that stable mounting state of the second link shaft 343 to the second link plates can be formed. One end of the second link 300, which is connected to the first link 200, is disposed at the second joint J2, and the other end of the second link 300 is disposed at another element, i.e, a third joint J3 connected to wrist links 400 and 500 in this embodiment. That is, by virtue of this configuration, a compact space design is enabled along with the improvement of the performance owing to a reduction in the manufacturing cost and the weight. This is merely an example, and the present invention is not limited thereto but various design modifications can be made, such as being formed as a single hollow structure and the like.

The second link plate A 341 is connected to the link tendon connection side cover 311 in order to perform a rotation motion through the rotational force produced from the first link motor A 151. More than one second link shafts 343 are disposed between the second link plate A 341 and the second link plate B 346 to form a stable support structure.

The second link 300 includes a second counter balancer 340. The second counter balancer 340 includes a second spring block 345, a second counter balance wire 361, and a second compression spring 342. The second counter balancer 340 is connected at one end thereof to the second joint J2 and extends at the other end in a longitudinal direction of the second link 300 so that when the second link 300 is rotated about the second joint J2, the gravity of the second link 300 is compensated.

The second counter balancer 340 includes a second spring block 345, a second counter balance wire 361, and a second compression spring 342. The second spring block 345 has a structure in which it is spaced apart from the parallel link pulley 324 so that the second spring block 345 can be moved along a longitudinal direction of the second link 300. That is, the second spring block 345 is disposed between the second link plate A part 341 and the second link plate B part 346 in such a manner that the second link shaft 343 interposed the second link plate A part 341 and the second link plate B part 346 passes through the second spring block 345 and the second spring block 345 can be moved along the second link shaft 343 A second linear bush 344 is inserted into a through-hole formed in the second spring block 345 so that it can be smoothly moved on the second link shaft 343.

The second compression spring 342 is disposed between the second spring block 345 and the parallel link pulley 324. The second counter balance wire 361 is connected at one end thereof to an outer peripheral portion of the parallel link pulley 324, which is deviated from the center of rotation of the parallel link pulley 324 relative to the second joint J2, and is fixedly mounted at the other end thereof to the second spring block 345 so that when the second link 300 is rotated about the second joint J2, the second spring block 345 is moved along the longitudinal direction of the second link 300, i.e., along the longitudinal direction of the second link shaft 343 in this embodiment. The second counter balance wire 361 is connected to the second spring block 345 while passing through the second link plate A part 341, and the length of the second counter balance wire 361 is preferably set to be a length forming a predetermined state in which the second compression spring 342 is elastically compressed at an initial stage.

In addition, the second link 300 may further include a second counter balance wire roller 330 for guiding smooth movement of the second counter balance wire 361. The second counter balance wire roller 330 includes a second bearing plate 331, and second flange bearings 332 and 333. The second bearing plate 331 is connected to the second link plate A part 341. The second bearing plate 331 is rotatably connected to a side of the second link plate A part 331. The second counter balance wire 361 passes between two second flange bearings 332 and 333 in order to minimize the friction between the second link plate A part 331 and the second counter balance wire 361 and form a stable wire movement structure. Two protruded flanges are respectively formed at one ends of the two second flange bearings in such a manner as to be in a staggered arrangement relative to each other so that the second counter balance wire 361 is prevented from escaping from a predetermined path between two second flange bearings.

FIG. 6(d) shows a front cross-sectional view of the second spring block 345. The second link shafts (not shown in FIG. 6(d)) are inserted into the through-holes formed in the second spring block 345, and the parallelogram wire pair 252 and the second counter balance wire 361 are disposed to pass through the second link shaft.

Meanwhile, a second link wrist joint connection part 350 is connected to the second link plate B part 346. The third joint J3 may be disposed at the second link wrist joint connection part 350. The second link 300 and the wrist link (including a wrist main link and a wrist sub link) are connected to each other at the third joint J3. A parallel wrist pulley 414 is disposed at the third joint J3, and the double parallelogram unit (DPU) can match a rotation reference at the third joint with those of the first joint and the second joint. That is, the double parallelogram unit DPU) may include the parallel wrist pulley 414 disposed at the third joint J3. The parallel wrist pulley 414 of the double parallelogram unit (DPU) can be connected to the parallel link pulley 324 through the parallelogram wire 252 so as to be operated in cooperation with the parallel link pulley 324. That is, the parallelogram wire 252 wound around the parallel link pulley 324 is wound around the outer circumferential surface of the parallel wrist pulley 414, and then is fixedly retained by a parallel wrist pulley retaining part 414a formed on the outer surface of the parallel wrist pulley 414. Here, the parallelogram wire 252 is configured in pairs and may have a structure in which one is wound around the outer circumference of the parallel wrist pulley 414 in a clockwise direction and the other is wound around the outer circumference of the parallel wrist pulley 414 in a counter-clockwise direction, and then they are fixed to the parallel wrist pulley retaining part 414a.

Hereinafter, the operation process and the characteristics of the double parallelogram unit adopted in the present invention will be described.

Figure 14:
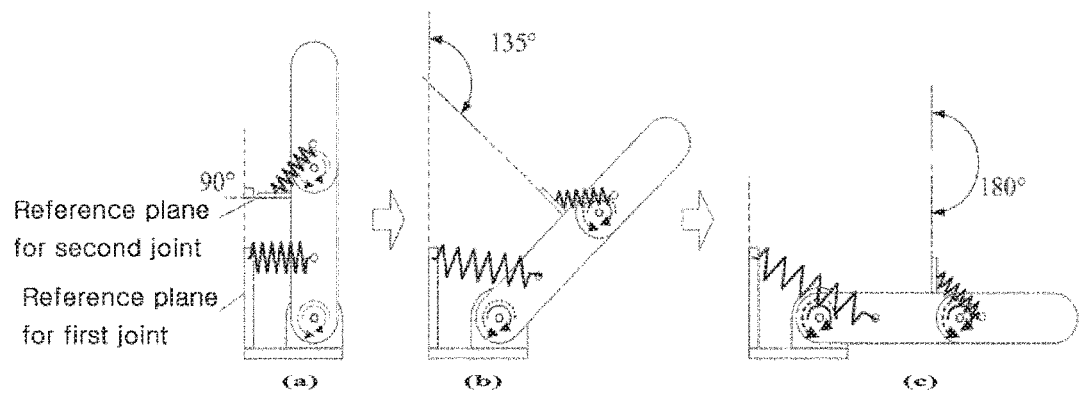
FIGS. 14, 15, 16 and 17 are conceptual diagrams illustrating the operation mechanism of a double parallelogram and a counter balancer.

The counter balancer is installed at a front link connected through a joint such as a shoulder joint requiring the largest torque in the robot. In this case, in a multi degree-of-freedom (DOF) robot arm, i.e., a multi-link robot arm, the movement of any one link has an effect on other links associated with the former link, but a dependency problem due to such association between the links is not solved by only a structure as shown in FIG. 9. That is FIG. 14 shows a problem occurring in the case where the counter balancer is included in the multi degree-of-freedom (DOF) robot arm. As shown in FIG. 14, when the counter balancer is installed on the multi degree-of-freedom (DOF) robot arm, a spring is mounted relative to a fixed plane (i.e., robot body) perpendicular to the ground surface in case of a first joint, but a link reference angle (i.e., ground surface reference angle) varies in case of a second joint, which makes it impossible to achieve gravity compensation for required torques that vary. In other words, although a torque applied to the second joint does not move the second joint, it varies depending on the position of the first joint. Thus, a reinforcing structure is needed which can properly change a torque compensated depending on the motion of a higher joint. In this regard, the double parallelogram unit of the present invention can cope with a torque change transfer due to the above association structure.

Figure 15:
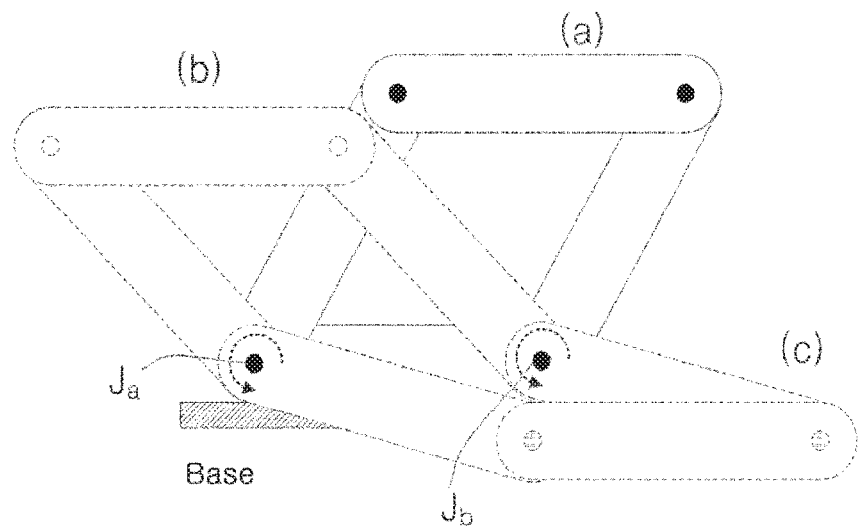

FIG. 15 is a conceptual diagram illustrating the concept of a parallelogram mechanism employed in the double parallelogram unit of the present invention. The parallelogram mechanism is a parallelogram-shaped mechanism that is composed of a link and a joint. Although the joint is rotated, the link forms a constant angle with the ground surface. That is, although the parallelogram mechanism implements various links such as (a), (b) and (c) shown in FIG. 15, the joints Ja and Jb maintain the same rotation state to form the same rotation reference. Thus, although the first joint is rotated, another reference plane is created which forms a constant angle with the ground surface to enable gravity compensation for the second joint.

Figure 7:
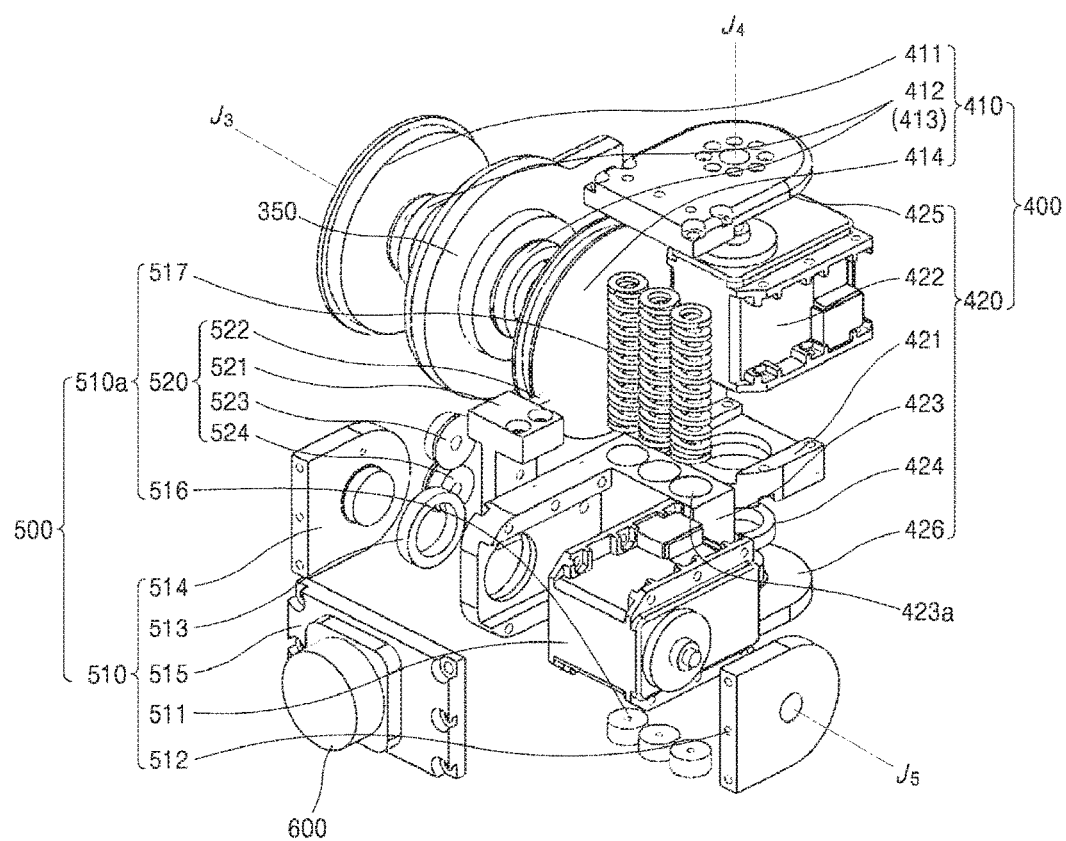
FIG. 7 is a schematic exploded perspective view illustrating wrist links of a wrist main link and a wrist sub link of a torque-free robot arm according to an embodiment of the present invention.
Figure 16:
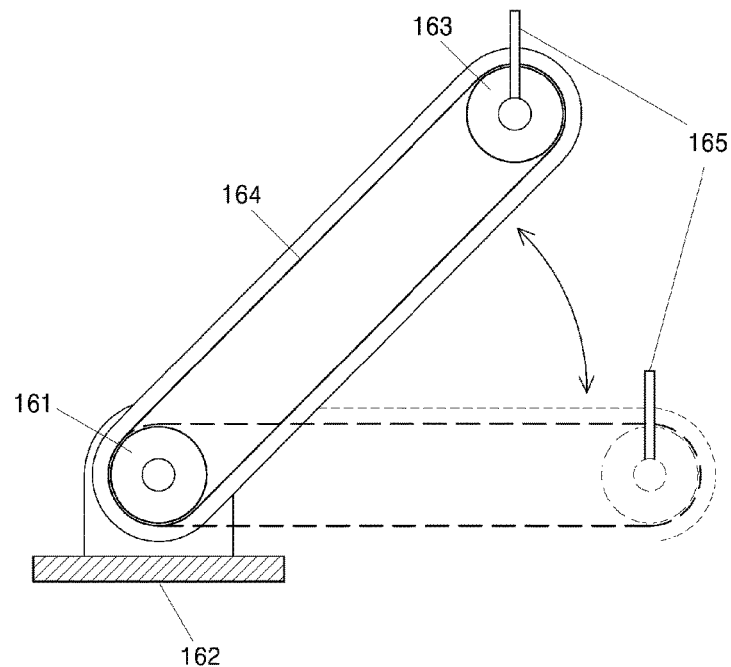
Figure 17:
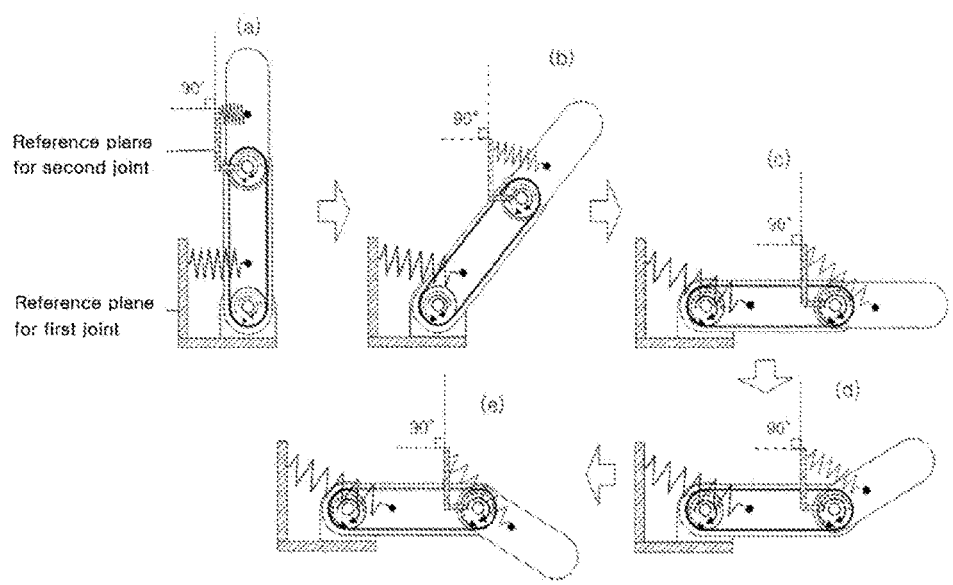

The present invention employs a modified wire structure as shown in FIG. 16 to apply the parallelogram mechanism to the robot arm. The parallelogram mechanism used in the present invention is composed of a first pulley 161 rotatably mounted to a base 162, a second pulley 163 rotatably mounted to a second joint, and a wire 164 for interconnecting two joints. Even in the case where a state mode is changed from a state (a) to a state (b), a reference plane 165 of the pulley disposed at the second joint is maintained constantly. In the case where this parallelogram mechanism to extend a link structure in which two links are consecutively connected to each other, it can be implemented as shown in FIG. 17. A reference plane perpendicular to the ground surface is also created for the second joint irrespective of the position of the first joint as shown in FIGS. 7(a) to 7(c). Based on this, when the second link is rotated about the second joint, gravity compensation for the second joint is enabled based on a reference plane perpendicular to the ground surface at the second joint (see FIGS. 17(d) and 17(e)). It can be seen from FIG. 17, that when a first joint is rotated in a gravitational direction, a spring for gravity compensation of a second joint is extended, leading an increase in a torque being compensated.

Figure 18:
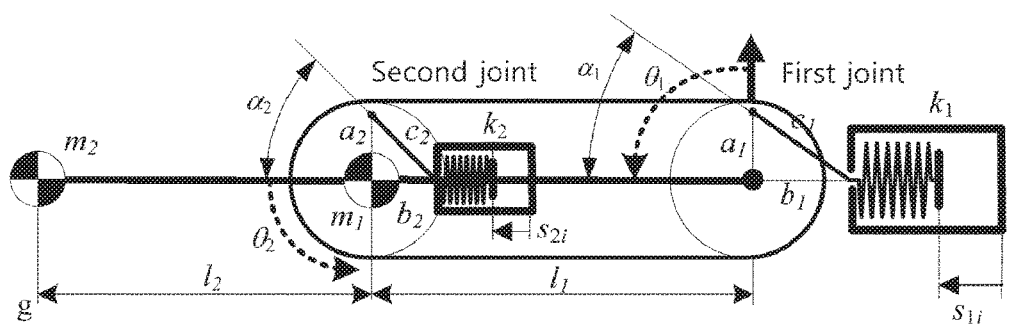
FIGS. 18, 19 and 20 are a conceptual diagram illustrating the operation performance of a double parallelogram unit and a counter balancer of multi-degree-of-freedom mechanism, and a diagrammatic view illustrating the results of simulation.

In FIG. 18, there is shown a conceptual diagram of a double link structure adopted in a first counter balancer and a second counter balancer of the present invention employing the parallelogram mechanism. The double link structure includes two consecutive links which are connected to each other. As shown in FIG. 18, a counter balancer employing a spring having a rigidity $k_i$ and an initial compression length $s_i$ is applied to a two degrees-of-freedom (DOF) robot arm (i.e., link) having a mass m and a moment arm length l, a torque $T_{gt}$ due to gravity, which is applied to the link as the robot arm and the joint, is calculated by the following equations:

$$T_{g1}(\theta_1, \theta_2) = m_1 g l_1 \sin\theta_1 + m_2 g\{L_1 \sin\theta_1 + l_2 \sin(\theta_1 + \theta_2)\}$$
$$= (m_1 g l_1 + m_2 g L_1)\sin\theta_1 + m_2 g l_2 \sin(\theta_1 + \theta_2)$$
$$T_{g2}(\theta_1, \theta_2) = m_2 g l_2 \sin(\theta_1 + \theta_2)$$

Also, a spring force calculation equation and a torque $T_{bal}$ are as follows:

$$F_{sj}(\theta_1,\theta_2)=k_j(s_{ij}+\Delta c_j)=k_j\{s_{ij}+c_j-(b_j-a_j)\}$$

$$c_1=\sqrt{a_1^2+b_1^2-2a_1b_1\cos\theta_1}$$

$$c_2=\sqrt{a_2^2+b_2^2-2a_2b_2\cos(\theta_1+\theta_2)}$$

$$T_{balj}(\theta_1,\theta_2)=b_j F_{sj}(\theta_j)\sin\alpha_j, \sin\alpha_j=a_j\sin\theta_j/c_j$$

$$T_{req1}(\theta_1,\theta_2)=T_{g1}(\theta_1,\theta_2)-T_{bal1}(\theta_1,\theta_2)$$

$$T_{req2}(\theta_1,\theta_2)=T_{g2}(\theta_1,\theta_2)-T_{bal2}(\theta_1,\theta_2)$$

Figure 19:
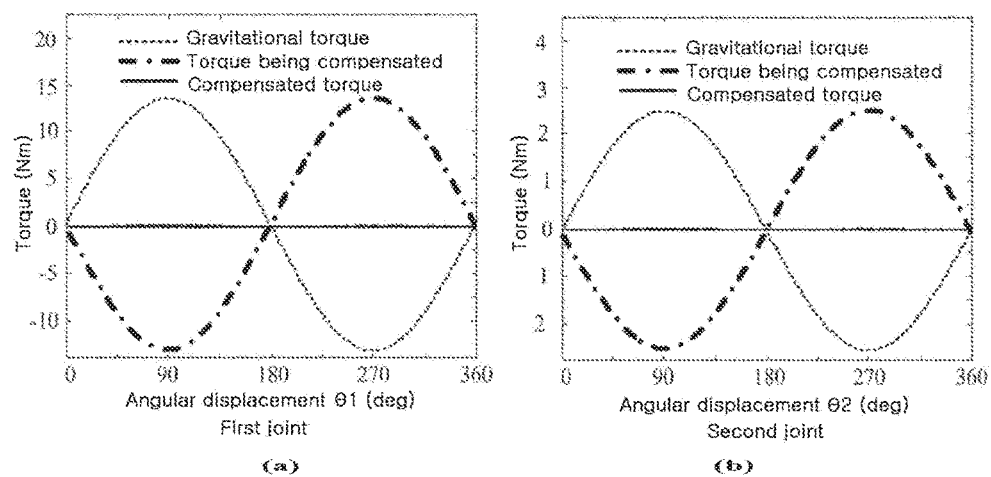

In an embodiment in which a counter balancer employing a spring wherein rigidity $k_1$ and $k_2$ are 8,240 N/m and 2,943 N/m, respectively, initial compression distances $s_{i1}$ and $s_{i2}$ are 25 mm and 20 mm, respectively, and lengths are $a_1$, $b_1$, $a_2$, and $b_2$ are 25 mm, 50 mm, 20 mm, and 40 mm, is applied to a robot arm wherein a mass $m_1$ and a mass $m_2$ are 3 kg and 2 kg, respectively, a length $L_1$ of a link 1 is 300 mm, the lengths $l_1$ and $l_2$ to the center of gravity of a link are 150 mm and 120 mm, respectively, the results of simulation as shown in FIG. 19 can be obtained. In this case, in this simulation, it was assumed that the second joint is not rotated. That is, it is assumed that the second link and the first link are always in parallel with each other. When a torque for driving an original link constituting a robot arm is denoted by a dotted line in the first joint (see FIG. 19 (a)) and the second joint (see FIG. 19 (b)), a torque denoted by a dashed dotted line is compensated by the counter balancer and only a torque as much as a solid line is required in order for the link of the robot arm to be moved actually. As shown in FIG. 19, it can be seen that when the multi-counter balancer is not included in the robot arm, a considerable torque (about 13 Nm/2.5 Nm) is needed by each joint, but when the multi-counter balancer is included in the robot arm, a required torque at each joint is 0.

Figure 30:
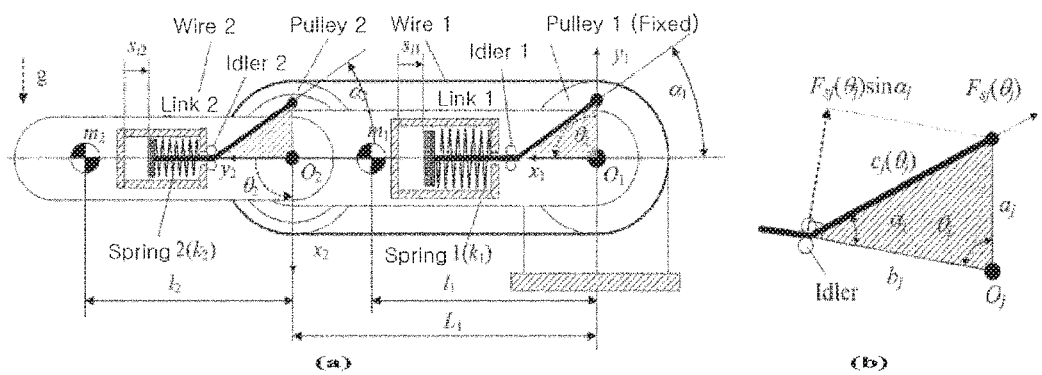
FIG. 30 illustrates a conceptual diagram of the operation performance of a double parallelogram unit and a counter balancer of a multi-degree-of-freedom (multi-DOF) mechanism, and a diagrammatic view illustrating the results of simulation thereof.

Meanwhile, although it has been described in the above description example that the compression spring is disposed at the rear of the link in the parallelogram mechanism, the present invention is not limited thereto. For example, there is shown in FIG. 30, a conceptual view of a double link structure employing a first counter balancer and a second counter balancer of the present invention which adopt the parallelogram mechanism. As shown in FIG. 30, the double link structure may have a configuration in which the spring is disposed along the longitudinal direction of the link. A mechanism relationship is shown in FIG. 30(a) and a force relationship is shown in FIG. 30(b). In addition, the correlation between the mechanism relationship and the force relationship is the same as described above.

Figure 20:
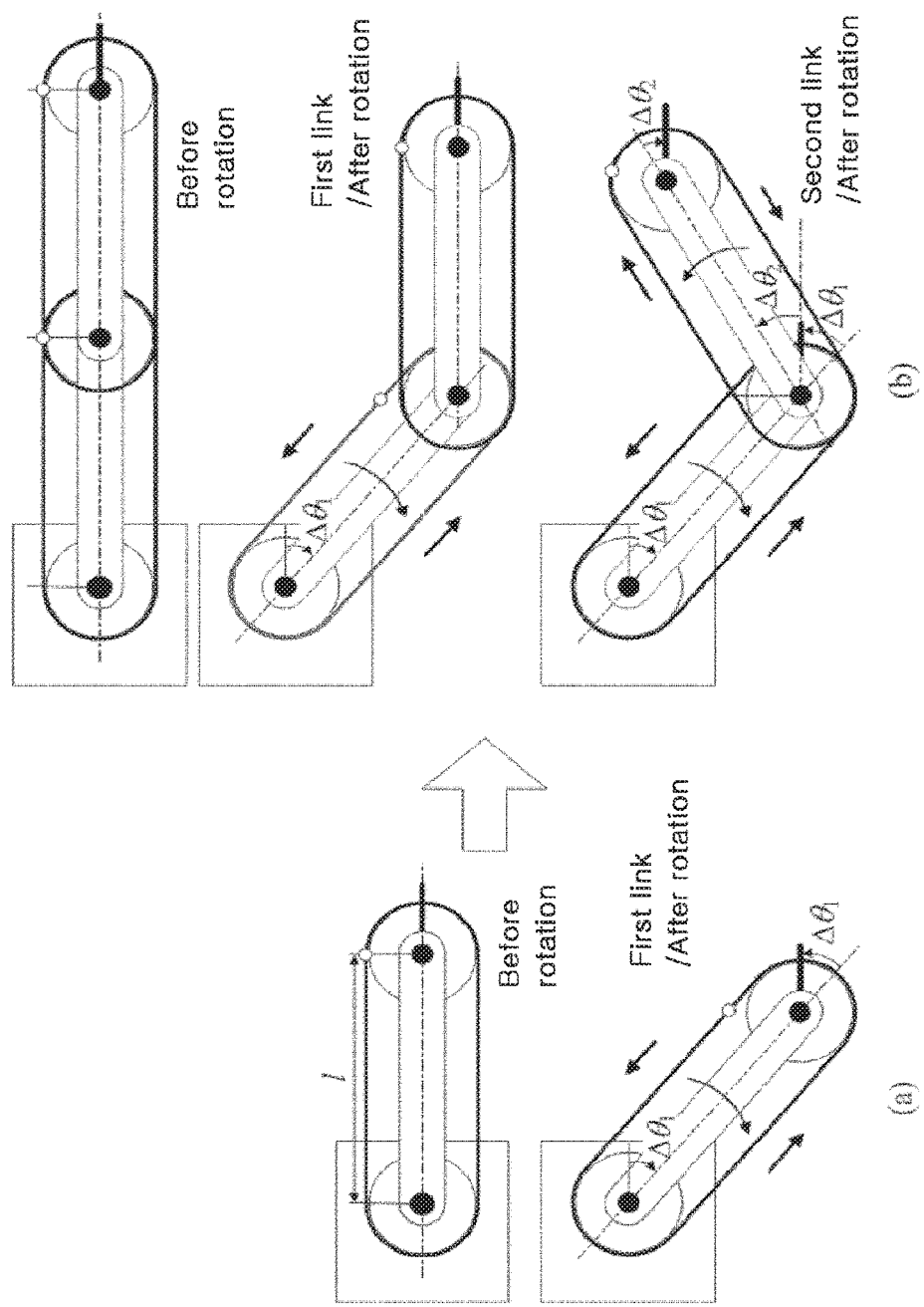

The double parallelogram unit (DPU) of the present invention is intended to be extended to a parallelogram mechanism for the multi-link structure, and forms the same reference for the first joint, the second joint, and the third joint in this embodiment so that stable and accurate gravity compensation can be achieved. That is, the present invention provides a torque-free robot arm including the double parallelogram unit in which two parallelogram mechanisms are connected in series with each other to achieve multi-degreeof-freedom (DOF) gravity compensation. Typically, a torque applied to a wrist joint of the robot arm has a lower value compared to a torque necessary for a shoulder and an elbow thereof. Since a space of a wrist part is narrow and small in terms of the characteristics of the robot arm, it requires a compact structure. In the case where a small motor is used, a torque suitable for gripping and moving an object cannot be created. In addition, a high-power small motor is used, leading to an increase in the cost. An effect of matching the gravity compensation references is achieved through a simplified structure using the double parallelogram unit of the present invention, thereby realizing lightweightness and reducing the manufacturing cost. In FIG. 20, there is shown a conceptual diagram of the double parallelogram unit of the present invention including a single parallelogram mechanism (FIG. 20(a)) an extended consecutive parallelogram mechanism (FIG. 20 (b)). In FIG. 20(a), there is shown a structure in which reference planes due to an angular displacement at a first joint are matched as much as an angular displacement at a second joint according to rotation of a first link. In addition, in FIG. 20(b), the first pressing flange and the parallel link pulley respectively disposed at the first joint and the second joint of the parallelogram mechanism are connected to each other and then are connected to the parallel wrist pulley disposed at the third joint using the parallelogram wire so that a reference plane (i.e., reference) applied to the first parallelogram mechanism is identically applied to the first parallelogram mechanism. Thus, ultimately, a gravity compensation reference plane for the third joint that is connected to the wrist link and can serve as a wrist can be formed in the same manner as the reference planes for the first joint and the second joint. That is, in the case where the first link and the second link are rotated by $\Delta\theta_1$ and $\Delta\theta_2$, respectively, the reference planes for gravity compensation at the first joint and the second joint are formed identically so that gravity compensation for the first link, which is adjusted according to the rotation of the first link by $\Delta\theta_1$, can be achieved. In addition, in regard to the second link, the same gravity compensation reference plane also is formed at the third joint based on the second joint so that gravity compensation for the second link, which is adjusted according to the rotation of the second link by $\Delta\theta_2$, can be achieved.

By virtue of such a configuration of the double parallelogram unit including the parallelogram mechanism and the counter balancer having the above technical concept, when the first link 200 connected to the base unit 100 is rotated by the power supplied thereto from the first link motor B, the parallel link pulley 324 and the parallel wrist pulley 414, which are connected to each other by means of the parallelogram wire 252 fixedly wound around the first pressing flange 215, are operated in cooperation with each other, so that a reference for the first and second counter balance wires of the first and second counter balancers is matched with that for the first pressing flange 215, and thus the same gravity compensation reference is provided to the first counter balancer and the second counter balancer, thereby achieving stable and accurate gravity compensation.

Figure 31:
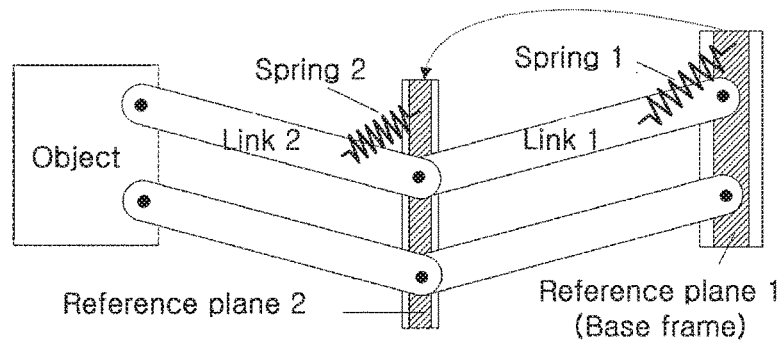
FIG. 31 is a diagrammatic view illustrating the cooperative operation relationship of reference planes of a multi-degree-of-freedom counter balancer.

In the meantime, in case of such a multi-degree-of-freedom (DOF) counter balancer, as shown in FIG. 31, the reference planes positioned at the respective joints cooperate with each other. Thus, in case of an n degree-of-freedom (n DOF) counter, a compensation torque for an i-th joint can be expressed by a sum of compensation torques produced from i-th counter balancers as in the following equation, and a torque due to gravity, applied to the i-th joint can be easily divided by a torque exerted to each counter balancer. For example, a gravitational torque $T_{g1}$ applied to a first joint can be expressed by a sum of two components, $(m_1gl_1+m_2gL_1)$ sin θ and $m_2gl_2$ sin($\theta_1+\theta_2$), which are changes in torque according to angular displacements of the first joint and the second joint. Thus, if the first counter balancer produces a compensation torque corresponding to a component $(m_1gl_1+m_2gL_1)$ sin θ and the second counter balancer produces a compensation torque corresponding to a component $m_2gl_2$ sin($\theta_1+\theta_2$), a gravitational torque Tgl applied to the first joint can be completely compensated. Further, the torque $m_2gl_2$ sin($\theta_1+\theta_2$) compensated in the second counter balancer is equal to the gravitational torque $T_{g2}$ applied to the second joint, so that the gravity compensation for the second joint can also be achieved along with the first joint. Thus, a torque $T_{reqi}$ required for the i-th joint can be expressed by the following equation:

$$T_{reqi}(\theta_1, \theta_2, \ldots, \theta_n) = T_{gi}(\theta_1, \theta_2, \ldots, \theta_n) - \sum_i^n T_{bali}(\theta_1, \theta_2, \ldots, \theta_n)$$

In the meantime, the torque-free robot arm 10 of the present invention can take a structure in which a wrist link 400, 500 may further be connected to the third joint J3 where the parallel wrist pulley 414 is disposed. An end effector 600 may be provided to the wrist link 400, 500, and the torque-free robot arm 10 may have a structure in which additional links are consecutively connected. Although it has been illustrated in this embodiment that a motor enabling a roll motion is used as the end effector 600, it is merely an example and various modifications can be made.

The wrist link 400, 500 includes a wrist main link 400 and a wrist sub link 500. The wrist main link 400 includes a wrist main pitch joint connection part 410 and a wrist roll joint connection part 420. The wrist main pitch joint connection part 410 includes a wrist main pitch parallel connection part 411 and deep groove ball bearings 412 and 413. The wrist main pitch parallel connection part 411 is connected to the parallel wrist pulley 414 of the double parallelogram unit (DPU) in such a manner that the relative rotation between the second link wrist joint connection part 350 and the wrist main pitch parallel connection part 411/the parallel wrist pulley 414 can be performed at the third joint J3 with the second link wrist joint connection part 350 interposed between the wrist main pitch parallel connection part 411 and the parallel wrist pulley 414. The deep groove ball bearings 412 and 413 are disposed between the parallel wrist pulley 414 and the second link wrist joint connection part 350 to enable the relative rotation therebetween.

The wrist roll joint connection part 420 is disposed on a side of the parallel wrist pulley 414. When the parallel wrist pulley 414 is rotated by means of the parallelogram wire 252, the wrist roll joint connection part 420 performs a pitch movement together with the parallel wrist pulley 414. The wrist roll joint connection part 420 includes a wrist roll pitch connection base 426, a wrist roll motor 422, a wrist main sub connection part 423, a deep groove ball bearing 424, a wrist roll pitch connection cover 425, and a wrist roll motor base 421. The wrist roll motor 422 is disposed between the wrist roll pitch connection cover 425 and the wrist roll pitch connection base 426 so that the wrist roll motor can perform a roll movement about a fourth joint J4 having a vertical axis. That is, the wrist roll motor 422 is mounted on the wrist roll motor base 421 such that it is fixedly mounted to the side of the parallel wrist pulley 414 so as to be connected to the parallel wrist pulley 414. In addition, the wrist roll pitch connection cover 425 and the wrist roll pitch connection base 426 are disposed above and below the wrist roll motor 422 such that they are connected to a rotary axis to perform the relative roll movement with respect to the wrist roll motor 422. In this case, the deep groove ball bearing 424 is disposed on the wrist roll pitch connection base 426 so that when the wrist roll pitch connection base 426 and the wrist roll pitch connection cover 425 perform a roll rotation by a rotational force applied to the wrist roll motor 422, a smooth operation can be performed.

Figure 8:
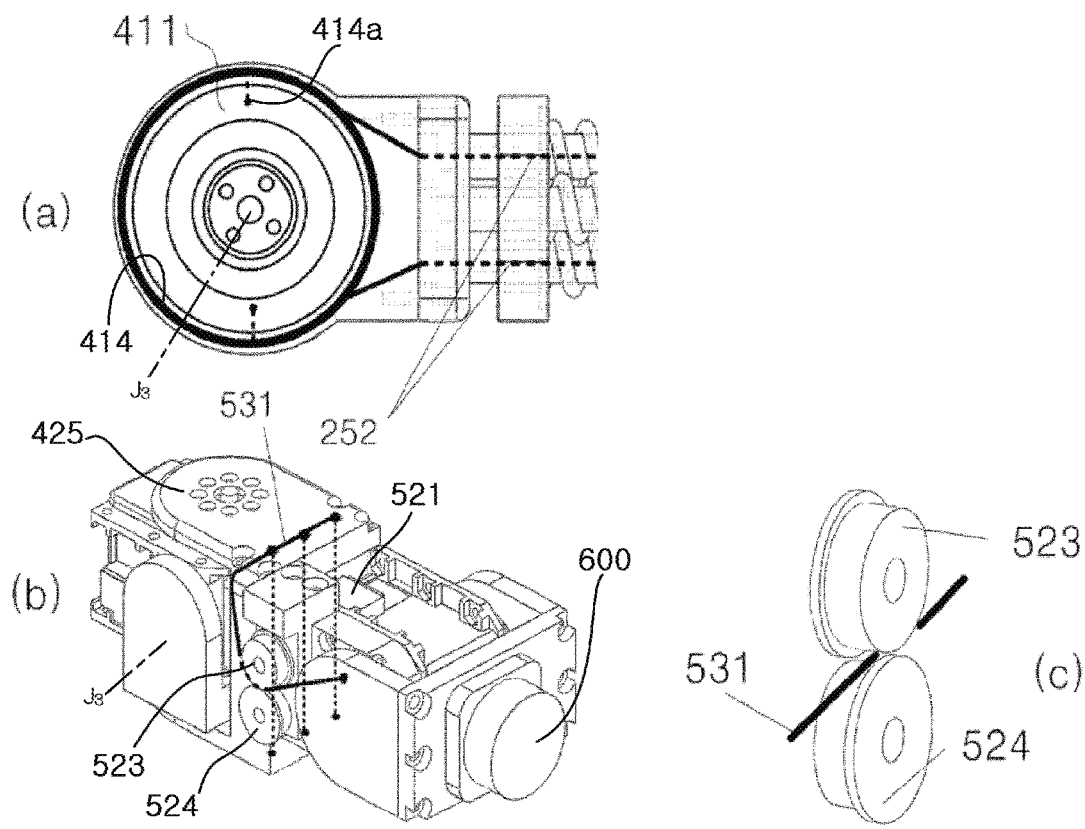
FIG. 8 illustrates a partial side view, a partial perspective view, and a partial front elevational view of a double parallelogram unit and a counter balancer in FIG. 7.

The wrist main sub connection part 423 is positioned in front of the wrist roll motor 422 disposed between the wrist roll pitch connection cover 425 and the wrist roll pitch connection base 426. At the wrist main sub connection part 423 is disposed a link pitch motor 511 and the wrist sub link 500 including the wrist sub pitch joint connection part 510. The wrist sub link 500 includes the wrist sub pitch joint connection part 510 and a wrist counter balancer 510a. The wrist sub pitch joint connection part 510 includes a wrist sub link side A part 512, a wrist sub link side B part 514, and a wrist sub link side front part 515. The wrist sub link side A part 512, the wrist sub link side B part 514, and the wrist sub link side front part 515 form a "⊏"-shaped link as shown in FIG. 8. The wrist sub link side A part 512 and the wrist sub link side B part 514 are disposed so as to be opposed to each other. The wrist sub link side front part 515 is connected with the wrist sub link side A part 512 and the wrist sub link side B part 514. The end effector may be disposed at the wrist sub link side front part 515. The wrist sub link side A part 512 and the wrist sub link side B part 514 are mounted so as to be rotated about the fifth joint J5. The link pitch motor 511 is disposed between the wrist sub link side A part 512 and the wrist sub link side B part 514. Between the link pitch motor 511 and the wrist sub link side A part 512 is disposed an extension part of the wrist main sub connection part 423 having through-holes formed therein, and the link pitch motor 511 and the wrist sub link side A part 512 are connected to each other to enable a smooth relative movement through the deep groove bearing 513. In addition, a rotary axis of the link pitch motor 511 is connected to the wrist sub link side B part 514 to enable a smooth pitch movement of the wrist sub link 500 which the wrist sub link side A part 512, and the wrist sub link side B part 514, and the wrist sub link side front part 515 constitute.

In the meantime, the wrist sub link 500 includes a wrist counter balancer 510a. The wrist counter balancer 510a includes a wrist counter balance wire 531, a wrist spring block 516, a wrist compression spring 517, and a wrist wire guide 520. The wrist counter balance wire 531 is fixed at one end thereof to the wrist sub link side B part 514 of the wrist sub pitch joint connection part 510 of the wrist link, i.e., the wrist sub link 500, and is connected at the other end thereof to the wrist spring block 516.

The wrist compression spring 517 is disposed so as to confront the end effector 600 disposed at the wrist sub link side front part 515 with the link motor, i.e., the link pitch motor 511 interposed between the wrist compression spring 517 and the end effector 600. The wrist compression spring 517 is disposed perpendicular to the fifth joint J5 as a rotary axis of the wrist sub link 500. That is, the wrist main sub connection part 423 has a compression spring accommodating part 423a formed therein so as to be perpendicular to the fifth joint J5 about which the wrist sub link 500 is rotated so that the wrist compression spring 517 is received in the compression spring accommodating part 423a. Before the wrist compression spring 517 is received in the compression spring accommodating part 423a, the wrist spring block 516 is first received in the compression spring accommodating part 423a. The wrist spring block 516 is brought into close contact with one end of the wrist compression spring 517 and is connected to the other end of the wrist counter balance wire 531 passing through the wrist compression spring 517. The wrist spring block 516 is elastically supported by the wrist compression spring 517. When the wrist sub link 500 which the wrist sub link side A part 512, and the wrist sub link side B part 514, and the wrist sub link side front part 515 constitute is rotated about the fifth joint J5, the wrist counter balance wire 531 is extended. At this time, when an elastic support force is exceeded, the wrist counter balance wire 531 is moved in the compression spring accommodating part 423a.

At this point, the wrist counter balance wire 531 is guided through the contact with the wrist wire guide 520 so that a compact configuration is attained.

The wrist wire guide 520 includes a wrist wire roller part, for example a pair of wrist wire rollers 523 and 524, a wrist wire guide pin 522. The wrist wire rollers 523 and 524 and the wrist wire guide pin 522 are disposed at the wrist wire roller plate 521. The wrist wire roller plate 521 is fixedly mounted to an extension part of the wrist roll pitch connection base 423 (see FIG. 7). The wrist wire rollers 523 and 524 are rotatably mounted to a side of the wrist roll pitch connection base 423. The wrist wire roller plate 521 takes a structure in which it does not perform a relative movement with respect to the link motor, i.e., the link pitch motor 511, but is fixed in position with respect to the link pitch motor 511 so that a stable guide function can be performed on the wrist wire of the wrist wire guide. The wrist wire rollers 523 and 524 have a flanged structure. That is, two protruded flanges are respectively formed at one ends of the two wrist wire rollers 523 and 524 in such a manner as to be in a staggered arrangement relative to each other so that the wrist wire 531 passing between the wrist wire rollers 523 and 524 can be prevented from escaping from a predetermined path between the wrist wire rollers (see FIG. 8(c)). The wrist wire guide pin 522 is disposed on a top of the wrist wire roller plate 521 to guide the wrist wire 531. The wrist wire guide pin 522 is protruded from the wrist wire roller plate 521 to guide the wrist wire 531 such that it is connected to the wrist spring block 516 accommodated in the compression spring accommodating part 423a. At this time, the wrist wire 531 guided toward the top of the wrist wire guide pin 522 through the wrist wire guide pin 522 can be oriented toward the compression spring accommodating part 423a after passing through the wrist roll pitch connection cover 425. That is, the wrist roll pitch connection cover 425 has a through-hole 425a formed therein so as to allow the wrist wire 531 to be inserted thereinto and extend in the longitudinal direction of the compression spring accommodating part 423a so that the wrist wire 531 can be smoothly connected to the wrist spring block 516 accommodated in the compression spring accommodating part 423a. The wrist compression spring 517 has a structure which elastically supports the wrist spring block along with the interconnection between the wrist wire and the wrist spring block. Preferably, the wrist compression spring 517 forms an initial tension state so that a certain compressed state is formed in the wrist compression spring 517 between the wrist roll pitch connection cover 425 and the wrist spring block even in an initial state (i.e., a state in which an external force is not exerted to the spring), and then the wrist compression spring 517 is connected in such a manner as to allow an initial elastic retarding force to be applied to the wrist spring block, ultimately, to the wrist wire.

Figure 21:
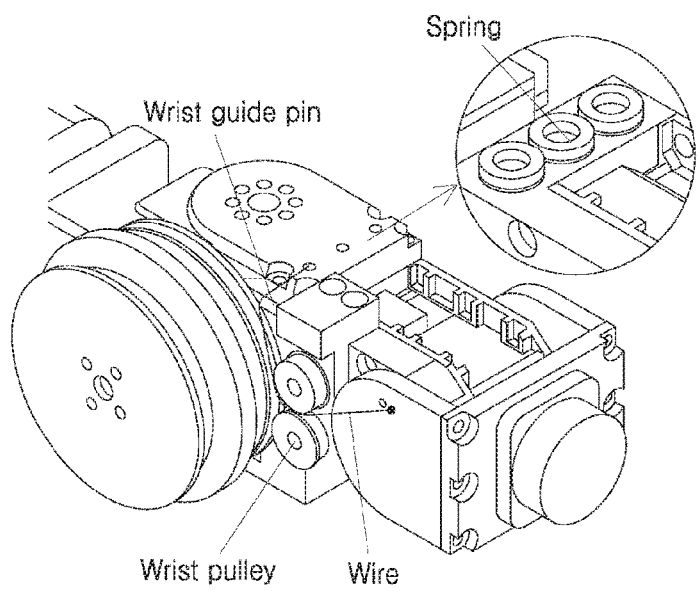
FIG. 21 illustrate a partial perspective view and a partial side view of a counter balancer of a wrist link.
Figure 21:
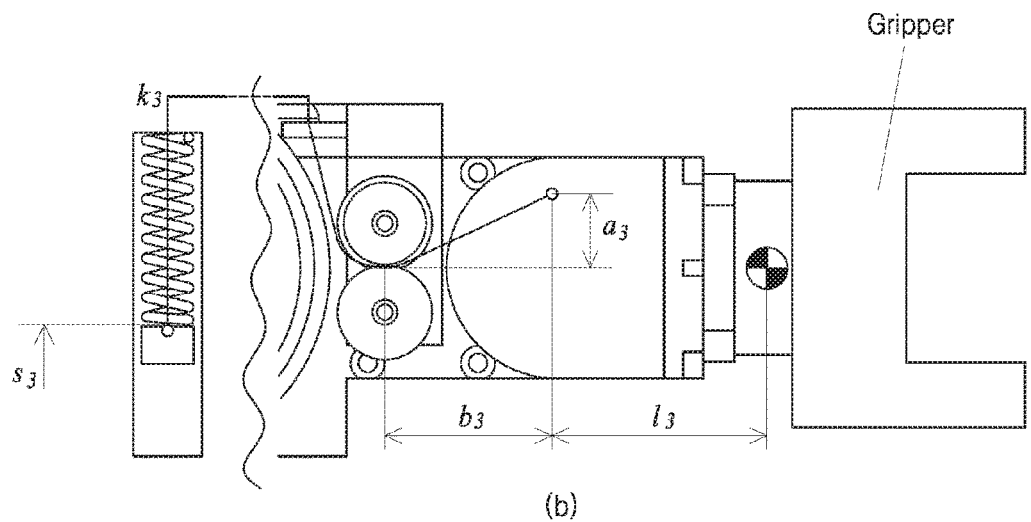
Figure 22:
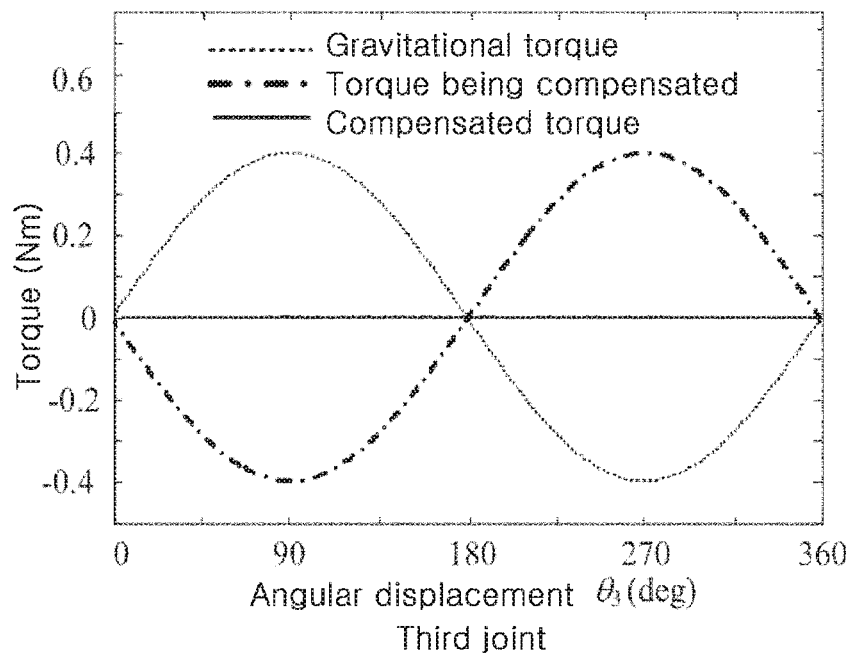
FIG. 22 is a diagrammatic view illustrating the results of simulation of the operation performance of a counter balancer of a wrist link.

An embodiment of the wrist counter balancer disposed at the wrist link is shown in FIGS. 21(a) and 21(b). Here, a wrist counter balancer in which a spring rigidity $k_3$ is 1,000 N/m, an initial compression distance $d_3$ is 10 mm, and lengths $a_3$ and $b_3$ are 15 mm and 25 mm, respectively, is applied to a robot arm in which a mass $m_3$ including a gripper attached to the end effector is 0.5 kg, a length from an end of the robot arm to the center of gravity $l_3$ is 90 mm. The set numeric values may be adjusted depending on design requirements. The results of simulation in the embodiment of FIG. 21 are shown in FIG. 22. A stable gravity compensation can be achieved such that the results of simulation of gravity compensation in FIG. 21 is the same as those of gravity compensation at the first joint and the second joint as described above.

Figure 32:
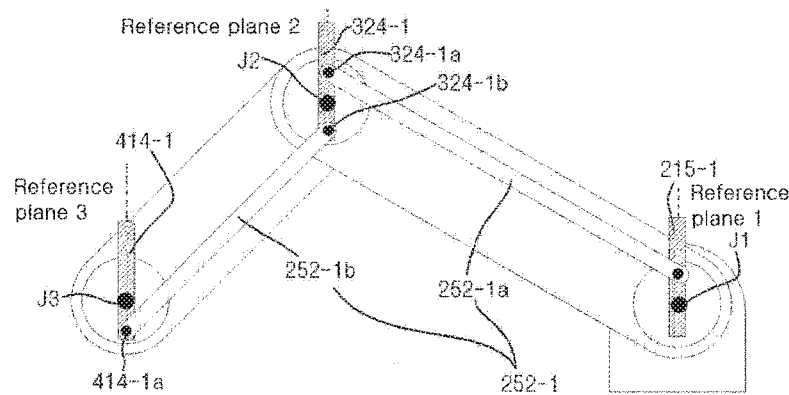
FIG. 32 is a schematic diagrammatic view illustrating a link type double parallelogram unit.

The above embodiments are merely to illustrate the present invention, and the present invention is not limited thereto. Although it has been illustrated in the above embodiments that the parallelogram unit employs the parallelogram wire, various modifications can be made within a range of forming references of respective joints identically. That is, as shown in FIG. 32, the double parallelogram unit includes a parallel base bar 215-1 that is arranged perpendicular to the center of a first joint J1 and includes a parallel base bar connection part 215-1a positioned spaced apart, in a radial direction (i.e., a direction perpendicular to an axis of the first joint), from the center of the first joint along the longitudinal direction of the parallel base bar, a parallel link bar 324-1 that is arranged perpendicular to the center of a second joint J2 and includes a first parallel link bar connection part 324-1a positioned spaced apart, in a radial direction (i.e., a direction perpendicular to an axis of the second joint), from the center of the second joint along the longitudinal direction of the parallel link bar, and a parallelogram rod 252-1 that includes a parallelogram base rod 252-1a connected at both ends thereof to the parallel base bar connection part 215-1a and the first parallel link bar connection part 324-1a, respectively. References of the rotation angle of the parallel base bar 215-1 and the parallel link bar 324-1 respectively disposed at the first joint J1 and the second joint J2 relative to the ground surface are formed identically. In this case, a third joint is formed at the other end of the second link, and the double parallelogram unit further includes a parallel wrist bar 414-1 that is arranged perpendicular to the center of the third joint J3 and includes a parallel wrist bar connection part 414-1a positioned spaced apart, in a radial direction, from the center of the third joint along the longitudinal direction of the parallel wrist bar. In this case, the parallelogram rod 252-1 further includes a parallelogram link rod 252-1b. The parallelogram link rod 252-1b is connected at one end thereof to the parallel wrist bar connection part 414-1a and is connected at the other end thereof to the parallel link bar 324-1. More specifically, the parallel link bar connection part 324-1a/324-1b included in the parallel link bar 324-1 includes a first parallel link bar connection part 324-1a and a second parallel link bar connection part 324-1b. The first parallel link bar connection part 324-1a and the second parallel link bar connection part 324-1b are arranged so as to be opposed to each other with the center of the second joint J2 positioned therebetween. By virtue of this link type parallelogram unit, the reference planes 1, 2 and 3 at the first joint, the second joint, and the third joint can form the same rotation angle reference as in the ground surface.

Figure 33:
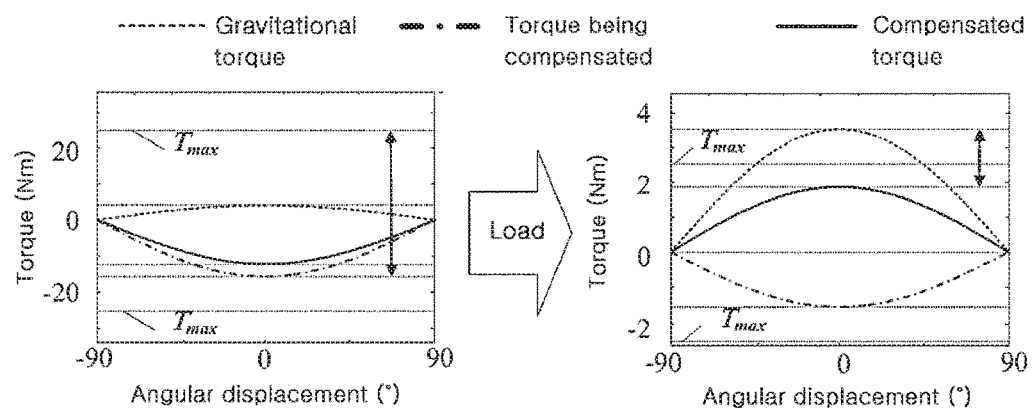
FIG. 33 is a diagrammatic view illustrating a possibility of change of a gravity compensation state according to the adjustment of a counter balancer.

In addition, as shown in FIG. 33, for example, in the above embodiments, a torque due to the robot mass (or gravity) is compensated using the counter balancer to allow a torque required to drive the robot to be zero. However, if the spring rigidity k and lengths a and b are adjusted to compensate for a torque larger than the torque due to the robot mass, the payload of the robot can be maximized. In this case, an initial force can be applied in an opposite direction (i.e., anti-gravitational direction) compared to an existing robot arm in a stationary posture. However, basically, in case of a motor torque, the same torque can produced in the positive (+) and negative (−) directions, and thus a posture of the robot can be sufficiently maintained. Thus, since the motor torque is within an allowable torque range, the posture of the robot can be maintained and the robot can be driven. When it is assumed that that a balancing torque larger than the gravitational torque is usually applied, a compensated torque is applied in the negative (−) direction (FIG. 33(a)), but it is still within the allowable torque range so that the posture of the robot can be maintained and the robot can be driven. In addition, the gravity compensation robot as designed above increases the limit of the compensated torque to a torque range in the positive (+) direction so that the payload of the robot can be maximized compared to an existing robot (see FIG. 33(b)).

Further, although it has been described in the above embodiments that the transfer of a rotational force is implemented through the wires, it may be implemented using the link structure.

As described above, various modifications can be made within a range of providing the counter balancers disposed along the longitudinal directions of the links.

The embodiments as described above are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

INDUSTRIAL APPLICABILITY

The torque-free robot arm of the present invention can be applied to household robots or devices besides industrial robots or instruments. In addition, the inventive torque-free robot arm can also be used in devices for implementing a precise motion to perform a stable operation as well as can be applied to a wide range of industrial instruments, devices and facilities.

The invention claimed is:
1. A torque-free robot arm comprising: a base unit;
a first link rotatably connected at a first end thereof to the base unit to form a first joint as a rotary axis horizontal to a ground surface, center of gravity being separated from the first joint, wherein the first link comprises a first counter balancer that is disposed at the first end thereof at the first joint and is disposed at a second end thereof opposite to the first end in a longitudinal direction of the first link so that the first counter balancer compensates for weight of the first link when the first link is rotated about the first joint;
a second link rotatably connected at a first end thereof to the first link to form a second joint as a rotary axis horizontal to the ground surface, a center of gravity being separated from the second joint;
a first pressing flange disposed at the base unit and configured to transfer a rotational force applied thereto to the first link; and
a unit including a link pulley and a wire, wherein the link pulley is rotatably disposed at one end of the second link where the second joint is formed, wherein the wire is arranged in pairs such that a pair of wires are fixed to the first pressing flange at a first end of each of the pair of the wires so as to be surroundingly wound around an outer circumference of the link pulley, and then is retained by a link pulley retaining part disposed on an outer circumferential surface of the link pulley, wherein references of rotation angles of the first pressing flange and the link pulley respectively forming the first joint and the second joint relative to the ground surface are formed identically, wherein a parallel wrist pulley is disposed at a second end of the second link opposite the first end of the second link to form a third joint that is in parallel with the second joint, and wherein in order for the unit to match reference of rotation angle of the parallel wrist pulley relative to the ground surface with that of rotation angle of the link pulley and the first pressing flange relative to the ground surface when the first link rotates about the first joint or the second link rotates about the second joint the pair of wires extend along the longitudinal direction of the second link after being retained by the link pulley retaining part of the link pulley, are wound at a second end of each of the pair of the wires around an outer circumferential surface of the parallel wrist pulley, and are fixedly retained by a parallel wrist pulley retaining part formed on an outer surface of the parallel wrist pulley.

2. The torque-free robot arm according to claim 1, wherein the first counter balancer comprises:
 a first spring block disposed spaced apart from a first pressing flange disposed at the base unit to transfer a rotational force applied thereto to the first link so that the first spring block can be moved along a longitudinal direction of the first link;
 a first counter balance wire connected at a first end thereof to an outer peripheral portion of the first pressing flange, which is deviated from a center of rotation of the first pressing flange relative to the first joint, and fixedly mounted at a second end thereof opposite the first end to the first spring block so that when the first link is rotated about the first joint, the first spring block is moved along the longitudinal direction of the first link; and
 a first compression spring disposed between the first spring block and the first pressing flange.

3. The torque-free robot arm according to claim 2, wherein the first link comprises:
 a pair of first link plates disposed opposed to each other such that the first spring block and the first compression spring are interposed therebetween, and including a first link plate A part disposed between the first pressing flange and the first compression spring and a first link plate B part disposed such that the first spring block is positioned between the first compression spring and the first link plate B part; and
 a first link shaft disposed between the first link plates,
 wherein the first counter balance wire is disposed so as to pass through the first link plate A part, and the first compression spring is disposed so as to be fitted around an outer circumference of the first link shaft along the longitudinal direction of the first link shaft.

4. The torque-free robot arm according to claim 3, wherein the first link comprises a first counter balance wire roller disposed between the first link plates and the first pressing flange so as to guide the first counter balance wire while coming into close contact with the first counter balance wire.

5. The torque-free robot arm according to claim 1, wherein the second link comprises a second counter balancer that is disposed at the first end thereof at the second joint and is disposed at a second end thereof opposite the first end in a longitudinal direction of the second link so that the second counter balancer compensates for the weight of the second link when the second link is rotated about the second joint.

6. The torque-free robot arm according to claim 5, wherein the second counter balancer comprises:
 a second spring block disposed spaced apart from the link pulley rotatably disposed at the one end of the second link where the second joint is formed so that the second spring block can be moved along a longitudinal direction of the second link;
 a second counter balance wire connected at a first end thereof to an outer peripheral portion of the link pulley, which is deviated from a center of rotation of the link pulley relative to the second joint, and fixedly mounted at a second end thereof opposite the first end to the second spring block so that when the second link is rotated about the second joint, the second spring block is moved along the longitudinal direction of the second link; and
 a second compression spring disposed between the second spring block and the link pulley.

7. The torque-free robot arm according to claim 6, wherein the second link comprises:
 a pair of first link plates disposed opposed to each other such that the second spring block and the second compression spring are interposed therebetween, and including a second link plate A part disposed between the link pulley and the second compression spring and a second link plate B part disposed such that the second spring block is positioned between the second compression spring and the second link plate B part; and
 a second link shaft disposed between the second link plate A part and the second link plate B part,
 wherein the second counter balance wire is disposed so as to pass through the second link plate A part, and the second compression spring is disposed so as to be fitted around an outer circumference of the second link shaft along the longitudinal direction of the second link shaft.

8. The torque-free robot arm according to claim 7, wherein the second link comprises a second counter balance wire roller disposed between the second link plate A part and the second link plate B part and the link pulley so as to guide the second counter balance wire while coming into contact with the second counter balance wire.

9. The torque-free robot arm according to claim 1, wherein a first one of the pair of wire pairs is wound around an outer circumference of the first pressing flange and the outer circumference of the link pulley in a clockwise direction, and a second one of the pair of wire pairs is wound around the outer circumference of the first pressing flange and the outer circumference of the link pulley in a counterclockwise direction.

10. The torque-free robot arm according to claim 9, wherein the second link comprises a second counter balancer that is disposed at one end thereof at the second joint and is disposed at the other end thereof in a longitudinal direction of the second link so that the second counter balancer compensates for the weight of the second link when the second link is rotated about the second joint, and the wire pair are fixedly retained by the parallel wrist pulley retaining part formed on the outer surface of the parallel wrist pulley in such a manner that a first one of the pair of wires is wound around an outer circumference of the parallel wrist pulley in a clockwise direction and a second one of the pair of wires is wound around the outer circumference of the parallel wrist pulley in a counter-clockwise direction.

11. The torque-free robot arm according to claim 10, wherein a wrist link is disposed at an outer side of the parallel wrist pulley and an end effector unit is mounted thereto.

12. The torque-free robot arm according to claim 1, wherein the base unit comprises a first joint having a rotary axis perpendicular to the ground surface.

* * * * *